(12) United States Patent
Horibe et al.

(10) Patent No.: US 7,280,211 B2
(45) Date of Patent: *Oct. 9, 2007

(54) METHOD OF ADJUSTING MONITOR AXIS

(75) Inventors: Koji Horibe, Kasugai (JP); Yoshio Matsuura, Kasugai (JP)

(73) Assignee: Omron Corporation, Kyoto (JP)

( * ) Notice: Subject to any disclaimer, the term of this patent is extended or adjusted under 35 U.S.C. 154(b) by 303 days.

This patent is subject to a terminal disclaimer.

(21) Appl. No.: 11/093,396

(22) Filed: Mar. 29, 2005

(65) Prior Publication Data

US 2005/0219530 A1    Oct. 6, 2005

(30) Foreign Application Priority Data

Apr. 2, 2004 (JP) ............................ 2004-110589

(51) Int. Cl.
*G01B 11/00* (2006.01)

(52) U.S. Cl. ...................................... 356/399
(58) Field of Classification Search ......... 356/399–401
See application file for complete search history.

(56) References Cited

U.S. PATENT DOCUMENTS

2002/0189875 A1*  12/2002  Asanuma et al. ........... 180/169

FOREIGN PATENT DOCUMENTS

| DE | 10122664 A1 | 11/2002 |
| JP | 2002074339 | * 3/2002 |
| WO | WO01/57551 A1 | 8/2001 |

OTHER PUBLICATIONS

Partial European Search Report, Application No. EP05006443, dated Jul. 21, 2005.
Patent Abstracts of Japan, Publication No. 2002-074339, *On-Vehicle Image Pickup Unit*, Furusawa Isao, et al., published Mar. 15, 2002, filed Aug. 31, 2000.

* cited by examiner

*Primary Examiner*—Tarifur Chowdhury
*Assistant Examiner*—Isiaka O Akanbi
(74) *Attorney, Agent, or Firm*—Beyer Weaver LLP

(57) ABSTRACT

The invention relates to a method of adjusting a monitor having a radar and a camera and correcting the positions and orientations of their detection areas based on intensity of reflected light from a target object. A single target having a specified pattern of bright and dark areas in placed in front of the monitor in the detection areas of the radar and the camera. The detection area of the radar is adjusted first based on measurements taken of the target by the radar and thereafter axial displacement of the detection area of the camera is determined a coordinate conversion parameter is obtained based on an image of the target taken by the camera.

10 Claims, 16 Drawing Sheets

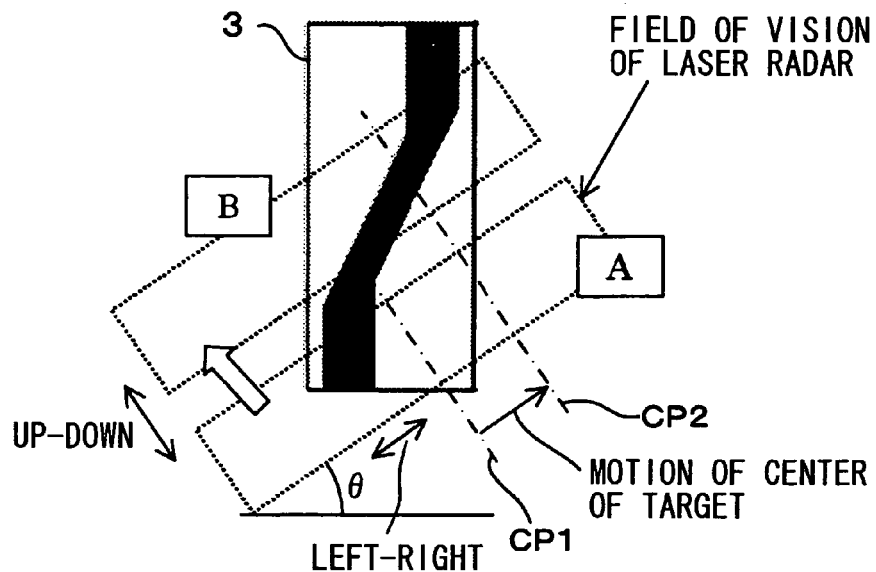
Fig. 4A
| MOTION OF OPTICAL AXIS OF LASER RADAR | MOTION OF CENTER OF TARGET SEEN BY SENSOR | DETERMINED DISPLACEMENT IN DIRECTION OF ROLLING |
|---|---|---|
| UPWARD | TO LEFT | CLOCKWISE |
| | TO RIGHT | COUNTER-CLOCKWISE |
| DOWNWARD | TO LEFT | COUNTER-CLOCKWISE |
| | TO RIGHT | CLOCKWISE |
Fig. 4B
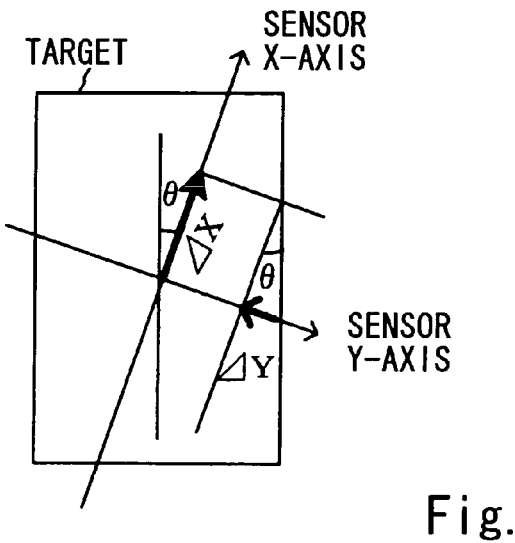
Fig. 4C

METHOD OF ADJUSTING MONITOR AXIS

Priority is claimed on Japanese Patent Application 2004-110589 filed Apr. 2, 2004.

BACKGROUND OF THE INVENTION

This invention relates to monitors such as radars adapted to be carried on a vehicle for obtaining position data of a front-going vehicle by making use of wave motion such as radar light and more particularly to the technology of adjusting the position and orientation of the detection area of such a monitor or its optical axis herein referred to as the monitor axis.

Apparatus of the kind carried on a vehicle for monitoring front-going vehicles and obstacles or for cruise control are widely being developed and the kinds with a radar using electromagnetic waves or a laser are generally known. They are devices for transmitting electromagnetic waves or laser light to an object of detection within a specified detection area and measuring the distance to a target object from the delay of a reflected signal.

In the case of a laser radar, for example, a specified scan area is irradiated with laser light while scanning it usually in one direction such as the horizontal left-right direction, a timing for light emission is generated by a control circuit in order to measure a delay by reflected light, a counter is started with this timing, a laser diode (LD) is driven according to this timing for laser light emission, the timing of reception of reflected light over a threshold level is taken in by a signal processor and the delay is measured by stopping the counter. The direction of a target object of detection may also be determined from the timing of the laser light emission or the scan angle at the timing of the reception of the reflected light.

On the basis of the measured distance data to the target object, the direction data, the data on the quantity of received light and the data on the speed of the vehicle obtained from a speed sensor, the individual distance data are grouped together and correlated with the data obtained in the past such that the relative speed of the target object is calculated, the identity of the target object (a vehicle, a bicycle, a person, a display board or a roadside reflector?) is established and it is determined whether an alarm should be outputted or not.

Some devices for a vehicle for monitoring the distance between vehicles are provided with an image sensor such as a CCD camera (hereinafter simply referred to as a camera). This is for the purpose of catching the wave motion (usually visible light) from a specified detection area near the vehicle by means of the image sensor and analyzing and judging the presence or absence of a front-going vehicle and its position on the basis of the brightness distribution on the image of the detection area obtained from the signal on the received wave motion.

More recently, devices of the so-called fusion type using both a radar and a camera are coming to be investigated because a device of the fusion type can have its radar and camera to mutually complement the shortcomings of each other.

When a device of the fusion type is actually installed on a vehicle, if its actual detection area (the area from which reflected waves are actually received) is displaced from the ideal detection area (normally an area symmetrically extending in both horizontal directions from the forward direction of motion of the vehicle at a specified height), the reliability of the result of measurement is accordingly reduced. Thus, the work of adjusting the center position of the detection area (or the adjustment of the optical axis in the case of a laser radar) becomes necessary on the production line of the vehicle or at the inspection time at a repair factory in order to maintain the device in the condition without such a displacement.

Adjustment of the position and the orientation of the detection area is sometimes referred to as the axial adjustment. FIG. 15A shows an example of conventional method of axial adjustment in the direction perpendicular to the standard direction of scan (normally the vertical direction). According to this method, a standard reflector is set on the upper limit of what is considered to be a proper detection area for a laser radar installed on a stationary vehicle and the laser radar is activated after a condition is prepared such that there is no cause of external disturbance and no object other than this standard reflector would be detected. The elevation angle and the installed position of the laser radar are manually changed downward gradually and set manually when the reflector ceases to be detected.

FIG. 15B shows an example of conventional method of axial adjustment in the standard direction of the scan (usually the horizontal direction). According to this method, the reflector is positioned at the center of what is considered to be an optimum detection area for a laser radar installed on a stationary vehicle and the laser radar is activated after a condition is prepared such that there is no cause of external disturbance and no object other than this standard reflector would be detected. Next, the angle of installation may be physically changed manually such that the detected position of the reflector will match the center of the detection area or a software parameter in the control system is varied by the processing of the control system.

As shown in FIG. 15B, the angular range of the actual scan by the laser light (or the scan area) is set to be greater than the detection area in which reflected waves are received to obtain distance data (or the detection area in the standard scan direction) such that the position of the detection area can be adjusted in the scan direction to a certain degree by varying the set position (software parameter) in data processing within the scan area of this detection area (or within the area which allows detection or the detection-permitting area) without physically varying the position of attachment of the detection head of the device. The position of the aforementioned scan area and detection area may be wholly adjusted to a certain extent in the direction of the scan by varying the set software parameter value of the range of operation of the scan mechanism.

Japanese Patent Publication Tokkai 2000-75031 disclosed a method of adjustment without the shortcomings of the conventional methods shown by FIGS. 15A and 15B, being able to adjust in a short time both in the scan direction and the perpendicular direction by using a single target. Japanese Patent Publications Tokkai 11-326495, 11-64489 and 7-225277 disclosed technologies of axial adjustment of a radar in the horizontal or perpendicular direction. Japanese Patent Publication Tokkai 2002-74339 disclosed a method of setting a specified mark at the front end of one's own vehicle and using this mark to adjust the direction of a camera, and Japanese Patent Publication Tokkai 2000-142221 disclosed a method of adjustment by taking a specified image.

All of these prior art axial adjustment methods are for adjusting the position of the central axis of a detection area in two directions (such as the horizontal direction and the perpendicular direction) and no thought is given to the axial displacement in the direction of rolling. In the above, the axial displacement in the rolling direction means the rotational displacement of the detection area around an axis of rotation from the condition where the standard direction is horizontally oriented. For this reason, there was a possibility with conventional devices that there may result a significant distance between a monitored position and an actual position near the edge of a detection area (far from the center axis) even after an axial adjustment and that no sufficiently accurate measurement could be made. In the case of an ordinary radar installed on a vehicle as a single body and in particular in the case of a one-dimensional scan radar adapted to scan only in one direction (usually the horizontal direction) without regard to the perpendicular directions (such as the vertical direction), axial displacements in the rolling direction were of no importance because measurement errors in the perpendicular directions presented no problem. If the monitoring device is of a fusion type, employing a plurality of sensors (such as a radar and a camera), however, the merits of the fusion type cannot be fully utilized without taking into consideration a proper correlation between the results of measurement by the sensors. Thus, it is necessary to adjust the axial displacement in the rolling direction and to keep the axial displacement small in the rolling direction or to grasp the axial displacement and to keep it reflected in the position data.

The conventional methods of axial adjustment had problems in the case of a fusion type employing both a radar and a camera because different targets had to be used for axially adjusting the radar and the camera independently of each other. Firstly, if the conventional method of axial adjustment is applied to the fusion form, the relative positional relationship between the radar and the camera may become inappropriate due to errors in setting targets or marks for the adjustment (such that the axes of the detection areas of the sensors may not be parallel or the sensors may be tilted with respect to each other in the rolling direction. This is because the positional errors between the vehicle and the sensors are multiplied together. It is also because the axial displacement of each sensor is in an unadjusted condition and the orientations of the detection areas in the rolling direction do not match. If the relative positional relationship between the sensors becomes incorrect, correlation cannot be properly taken between the data recognized by the sensors of the fusion type and the advantage of the fusion type fails to be taken sufficiently.

Since the axial adjustments of the radar and the camera are made by using different targets, furthermore, the adjustment becomes complicated and time-consuming.

SUMMARY OF THE INVENTION

It is therefore an object of this invention to provide a method of axial adjustment of a monitor by which the aforementioned problems of axial adjustment in particular in the case of the fusion type can be resolved.

The invention relates to a method of adjusting a monitoring apparatus adapted to carry out a measurement operation by receiving waves from a detection area at each position on a standard direction and outputting data for identifying at least position of a target object of detection in the detection area based at least on intensity of the received waves. The method serves to correct an axial displacement of the detection area in the direction of rolling and may be characterized as comprising the steps of providing a target having a detection surface having a specified peripheral shape and having a pattern of bright areas with a larger reflectivity and dark areas with a smaller reflectivity, the peripheral shape and the pattern being such that a waveform of W-form or inverse W-form is obtained due to the specified peripheral shape and the pattern if the measurement operation is carried out with the target placed in front of the monitoring apparatus and with the detecting area facing the detection surface, the waveform being such that a standard position of the detection surface (such as its center position) in the standard direction can be calculated therefrom, placing the target in front of the monitoring apparatus by orienting the detection surface according to the standard direction, carrying out the measurement operation at least twice by each time changing the position of the monitoring apparatus in the perpendicular direction to the standard direction (and adjusting an environmental condition according to the reflectivity of the pattern after the target was placed in front of the monitoring apparatus, if required), and determining the axial deviation of the detection area in the rolling direction based on change in the standard position calculated from the waveform. If necessary, the method may further include the step of correcting the determined axial deviation by changing angle of attachment of the monitoring apparatus or by changing a parameter for setting the detection area.

With such a method according to this invention, an axial deviation of an object monitoring apparatus in the direction of its rolling can be corrected easily because if there is such an axial deviation in the rolling direction, the standard position of the monitoring apparatus in its standard direction is not observed at a constant position as the position of measurement is changed in the perpendicular direction, and the observed value varies according to the magnitude of axial deviation in the rolling direction. In the case of a fusion type, the correlation between the results of observation by sensors (the position data of a target object of detection) can be correctly obtained according to this invention and the advantage of the fusion method can be fully taken by easily adjusting the axial deviation in the rolling direction.

In the above, the monitoring apparatus may consists only of a radar, only of a camera or include both a radar and a camera. The expressions "peripheral shape and pattern of bright and dark areas" on the detection surface are intended to be interpreted broadly such that the expression "pattern" may be sometimes interpreted to include the external shape. Thus, the obtained waveform need not necessarily be due strictly to both the areal pattern and the external shape separately. The expressions "W-form" and "inverse W-form" related to the obtained waveform are also intended to be interpreted broadly, meaning respectively a general waveform with two valleys with a hill in between or with two hills with a valley in between without strictly regard to the outer shapes of the waves.

As for the design (including both the peripheral shape and pattern of bright and dark areas) of the target, the following four examples may be considered favorable. According to a first example, as will be explained below with reference to FIGS. 2C and 14B, the peripheral shape has two parallel edges in the perpendicular direction and the width (L1) of the detection surface in the standard direction is made smaller than the width of the detection area in the standard direction. A pattern-forming area (either a bright area or a dark area) includes an elongated belt-like region traversing the center portion and inversion areas (with opposite brightness) on both sides thereof. If only the axial deviation in the rolling direction is to be detected, the belt-like region need not traverse the detection area diagonally but a diagonally traversing pattern is convenient because the same target can be used for detecting axial deviations both in the standard and perpendicular directions, as will be explained below. The expression "traversing" may be interpreted broadly as including traversing the center part in any direction including the vertical direction.

According to a second example, as will be explained below with reference to FIGS. 14A and 14C, the pattern includes an elongated belt-like region traversing the center part, inversion regions on both sides thereof and background regions further on both sides of the inversion regions. Either the center-traversing and background regions are bright regions and the inversion regions are dark regions or the center-traversing and background regions are dark regions and the inversion regions are bright regions. The boundaries between the inversion regions and the background regions are mutually parallel and the separation between these boundaries (shown as L1) is set to be smaller than the width of the detection area in the standard direction.

According to a third example, as will be explained below with reference to FIG. 13A, the width L1 of the detection surface in the standard direction is set smaller than the width of the detection area in the standard direction and the surface pattern comprises an elongated belt-like region traversing the center part in the perpendicular direction and inversion regions on its both sides, either of the center-traversing region and the inversion regions being bright and the other being dark. If the axial displacement only in the rolling direction is to be detected, there is no particular limitation as to the peripheral shape but it is convenient if it is made with outer edges that are parallel and diagonal to the perpendicular direction because a single target may be used for the detection of axial displacements both in the standard and perpendicular directions.

According to the fourth example, as will be explained below with reference to FIG. 13B, the surface pattern includes a center-traversing elongated belt-like region that traverses the center part in the perpendicular direction, inversion regions on its both sides and background regions further on both sides of the inversion regions. Either of the center-traversing and background regions and the inversion regions is bright, the other being dark. The distance L1 shown in FIG. 13B is set smaller than the width of the detection area in the standard direction. There is no particular limitation as to the direction of the boundary lines between the inversion regions and the background regions if the axial displacement only in the rolling direction is to be detected. It is extremely convenient, however to make these boundaries parallel to each other and diagonal to the perpendicular direction because a single target may be used for the detection of axial displacements both in the standard and perpendicular directions.

If a target according to these examples is used, a waveform of W-form or inverted W-form can be easily obtained for received intensity because the light intensity drops at the positions of the dark regions and rises at the positions of the bright regions.

The invention may also be described as relating to a method of adjustment a monitoring apparatus characterized as having a radar adapted to carry out a measurement operation by receiving waves from a first detection area at each position on a standard direction and outputting data for identifying at least position of a target object of detection in the first detection area based at least on intensity of the received waves and a camera for taking an image of a second detection area that overlaps the first detection area. The method of the invention is for serving to adjust positions and orientations of the first detection area and the second detection area and to obtain a coordinate conversion parameter between the radar and the camera, and may be characterized as comprising the steps of setting a single target at a specified position which is both in the first detection area and the second detection area, adjusting the first detection area based on measurements taken of the target by the radar, and thereafter determining axial displacement of the second detection area and obtaining the coordinate conversion parameter based on an image of the target taken by the camera.

The monitor in the above embodiment is characterized as using both a radar and a camera, and the first detection area means the detection area of the radar while the second detection area means the detection area of the camera. The coordinate conversion parameter in the above means a parameter for correct correlating between the position data for the target object obtained by the radar and the camera.

The method may further comprise the steps of obtaining axial displacement data on axial displacement of the first detection area or the second detection area based on results of measurement by the radar or the image of the target taken by the camera, displaying the axial displacement data on a display device, and adjusting the first detection area or the second detection area while observing the displayed axial displacement data until the axial displacement of the first detection area or the second detection area becomes within an allowable range.

The invention may be described further as relating to a method of adjusting a monitoring apparatus having a radar adapted to carry out a measurement operation by receiving waves from a first detection area at each position on a standard direction and outputting data for identifying at least position of a target object of detection in the first detection area based at least on intensity of the received waves and a camera for taking an image of a second detection area that overlaps the first detection area, the method of the invention being described as serving to adjust position and orientation of the first detection area and the second detection area and to obtain a coordinate conversion parameter between the radar and the camera and comprising the steps of setting a single target at a specified position which is both in the first detection area and the second detection area, determining adjustability of the first detection area based on measurements taken of the target by the radar and adjusting the first detection area only if it is determined to be adjustable, and thereafter determining adjustability of axial displacement of the second detection area based on an image of the target taken by the camera and obtaining the coordinate conversion parameter based on the image of the target taken by the camera if it is determined to be adjustable.

The method may further comprise the steps of obtaining axial displacement data on axial displacement of first detection area or the second detection area based on results of measurement by the radar or the image of the target taken by the camera, displaying the axial displacement data on a display device, and adjusting the first detection area or the second detection area while observing the displayed axial displacement data until the axial displacement of the first detection area or the second detection area becomes within an allowable range if adjustment is determined to be possible.

BRIEF DESCRIPTION OF THE DRAWINGS

FIGS. 4A, 4B and 4C are for explaining the principle for the adjustment of optical axis of the radar in the direction of rolling.

DETAILED DESCRIPTION OF THE INVENTION

Figure 1A:
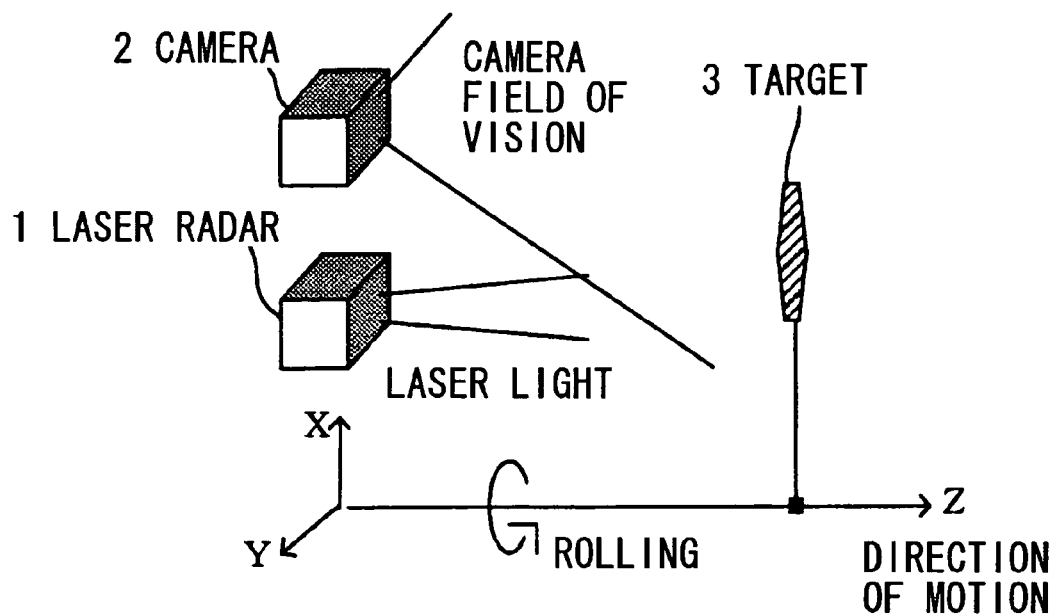
FIGS. 1A and 1B, together referred to as FIG. 1, show a monitor for using a method embodying this invention, FIG. 1A showing its principal structure and FIG. 1B being a block diagram of its control system.
Figure 1B:
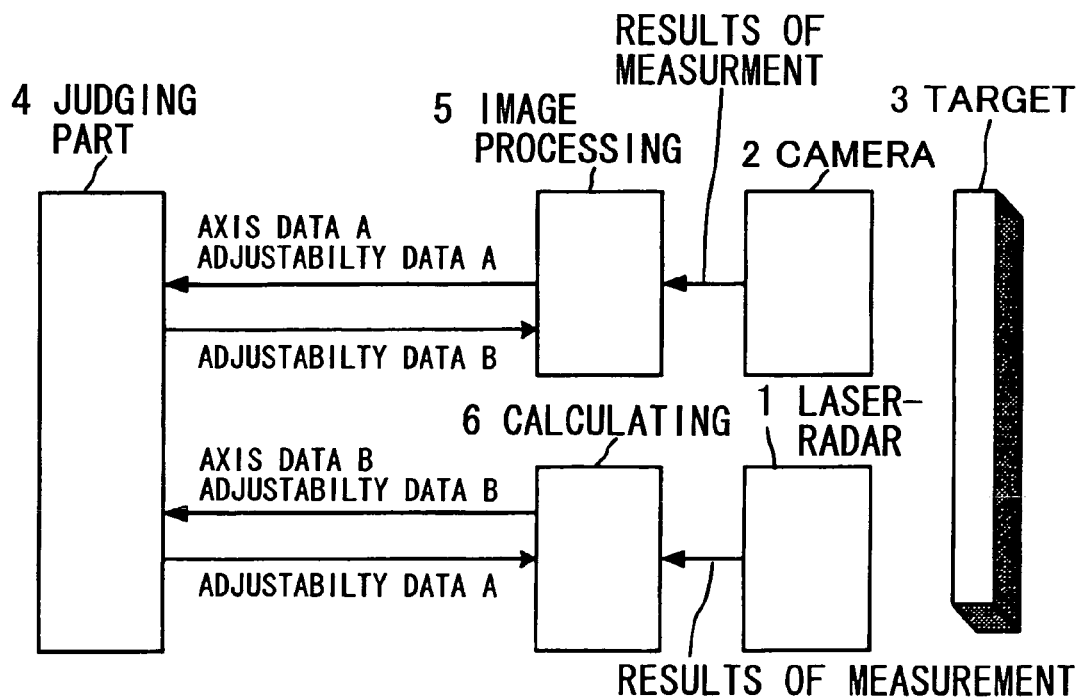
Figure 2A:
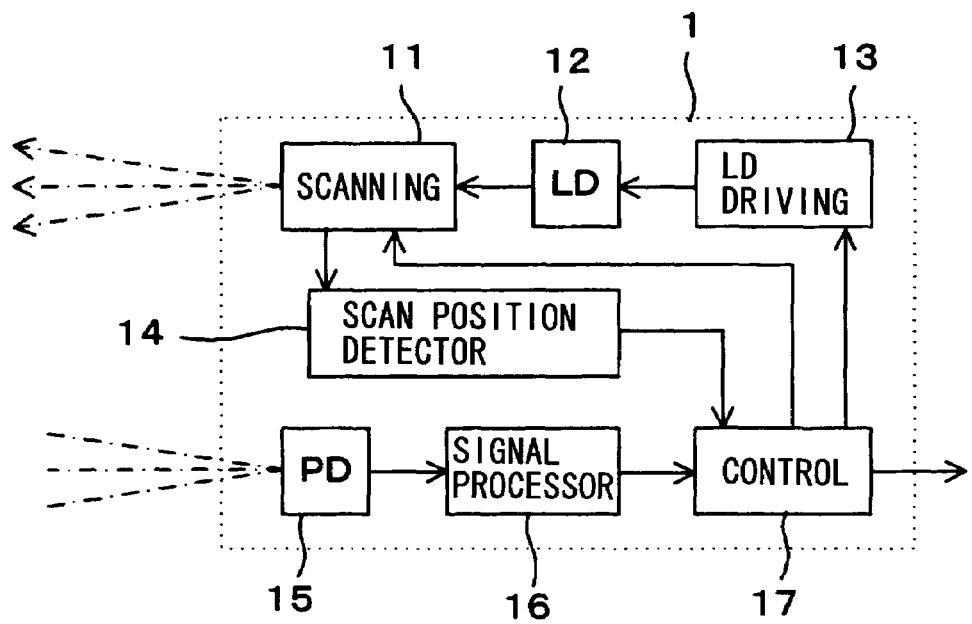
FIG. 2A is a block diagram of a laser radar.
Figure 2B:
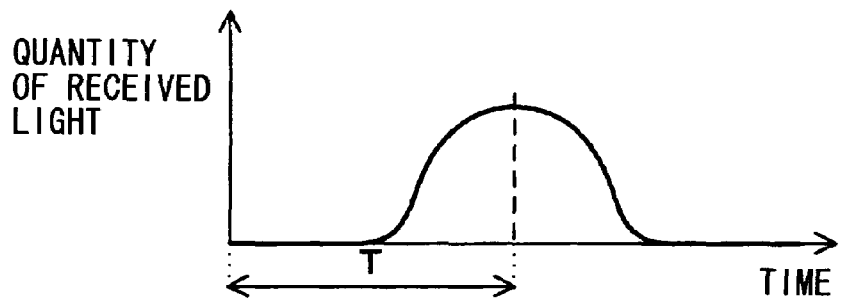
FIG. 2B is a drawing for showing the principle of measurement by the laser radar and FIG. 2C is a front view of a target used for adjustment.
Figure 2C:
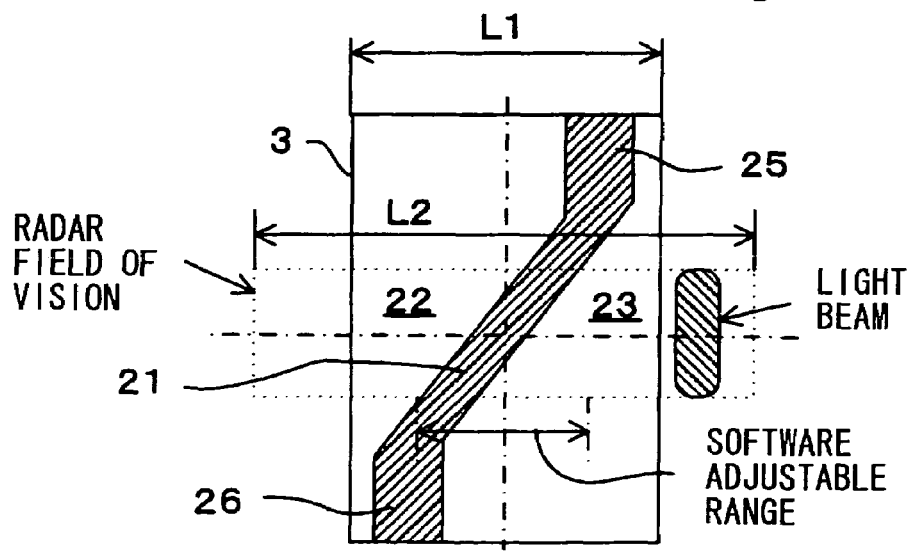

The invention is described next by way of an example with reference to FIGS. 1A, 1B, 2A, 2B and 2C. FIG. 1A shows the main structure of an equipment and FIG. 1B is a block diagram for explaining the control system of a monitor. FIG. 2A is a block diagram for showing the structure of a laser radar. FIG. 2B is a drawing for showing the principle of measurement by it, and FIG. 2C is a front view of a target used for adjustment.

In FIG. 1A, numeral 1 indicates a laser radar (hereinafter simply referred to as a radar) and numeral 2 indicates a camera set on the same vehicle as the radar 1. The radar 1 in this example is a two-dimensional scan laser radar capable of scanning in both the horizontal left-right direction and in the vertical up-down direction. Numeral 3 indicates a target used for adjustment. In this example, the left-right direction as seen from the radar 1 and the camera 2 is the standard direction of the scan and the vertical direction is sometimes referred to as the perpendicular direction (with respect to the standard direction). The coordinate system indicated by letters X, Y and Z is fixed to the vehicle or the position of the vehicle, X indicating the up-down direction and Y indicating the left-right direction as seen from the vehicle and Z indicating the direction of its motion. The direction of rotation around the Z-axis is the rolling direction.

The control system of this monitoring device (the monitor) is provided, as shown in FIG. 1B, with a judging part 4, an image processing part 5 and a calculating part 6. The image processing part 5 is an element adapted to carry out image processing on results of measurement (image data) by the camera 2. It carries out detection and judgment of a target object of detection at the time of a normal operation. At the time of axial adjustment, it serves to output data on the axial displacement of the camera 2 (optical axis data A) and its optical axis adjustability data A.

The calculating part 6 is an element adapted to carry out detection and judgment of the target object of detection based on results of measurement by the radar 1 at the time of a normal operation. At the time of axial adjustment, it serves to output data on the axial displacement of the radar 1 (optical axis data B) and its optical axis adjustability data B. The calculating part 6 and the control circuit 17 (to be described below with reference to FIG. 2A) may be formed together as a single circuit.

At the time of a normal operation, the judging part 4 carries out final judgments on the position and kind of the target object of detection based on the data outputted from the image processing part 5 and the calculating part 6. At the time of axial adjustment, it serves to receive and transmit the adjustability data A and B.

In the above, optical axis adjustability data A are adjustability data judged from the results of measurement by the camera 2 (or the image taken thereby), indicating whether or not its axial adjustment is impossible for a reason such as there is no target 3 that is set, the brightness-darkness pattern of the target 3 is incorrect, the target 3 is tilted excessively, or the whole of the target 3 is not visible due to the presence of a person or an obstacle in front of the target 3. Optical axis adjustability data B are adjustability data judged from the results of measurement by the radar 1, indicating whether or not its axial adjustment is impossible, for example, because the distance to the target 3 is abnormal.

The judging part 4, the image processing part 5 and the calculating part 6 may be formed as a circuit including one common microcomputer or separate microcomputers. According to the present example, the circuit comprising the judging part 4, etc. is connectable to an external display device (or a personal computer including an external display device) to be used for the work of axial adjustment.

An input means (not shown) is also adapted to be connected to the aforementioned circuit comprising the judging part 4, etc. to be operated by the user (in charge of inspecting of the vehicle at the time of its shipment and repairing after the shipment) for carrying out axial adjustment, including switches such that the processing of axial adjustment (to be described below with reference to FIG. 10) through the aforementioned microcomputer or microcomputers. In the place of the aforementioned input means, the keyboard or the mouse of a connected personal computer may be used for inputting commands by the user. The adjustment processing may also be carried out by the processing function of the connected personal computer.

As shown in FIG. 2A, the radar 1 is comprised of a scanning part 11, a laser diode (LD) 12, an LD driving circuit 13, a scan position detector part 14, a photodiode (PD) 15, a signal processor 16 and a control circuit 17. The portion including the LD 12, the scanning part 11 and the PD 15 forms the detection head of the radar 1.

The scanning part 11 is for scanning the scan area in the horizontal and vertical directions with the laser light outputted from the LD 12 by means of reflective mirrors, etc. and is operated at a specified timing and period by the control circuit 17. The LD driving circuit 13 is controlled by the control circuit 17 and serves to output laser light by activating the LD 12 at the timing generated by the control circuit 17. The scan position detector part 14 is an element for detecting the scan direction of the scanning part 11 and inputting a signal indicative thereof (the scan direction signal) to the control circuit 17. The PD 15 is for receiving the reflected laser light from a target object of detection and outputting an electrical signal according to the quantity of light received thereby (the light quantity signal). The light quantity signal outputted from the PD 15 is inputted to the control circuit 17 through the signal processor 16.

The control circuit 17 (and/or the aforementioned calculating part 6) may be formed, for example, with a microcomputer. At the time of a normal operation, it basically carries out the measurement operations of the radar by controlling the scanning part 11 and the LD driving circuit 13 as explained above, calculating the distance to the target object of detection from the transmission delay time T from the emission of light until its reception, judging the direction of the target object from the scan direction at the time, judging the quantity of received light from the intensity of the received light (the intensity of the aforementioned light quantity signal) and outputting detection data inclusive of the kind of the target object, its position data and size data.

The reflected light is actually not received all at once from a single emission of light because the emitted light has a finite extension. Thus, reflected light is received at different timings and with different intensities. If the sampled output waveform from the PD 15 is as shown in FIG. 2B, the transmission delay time T may be determined by an averaging method (by obtaining the center of gravity of a plurality of points near the maximum of the received light quantity). Alternatively, the sampled values corresponding to the transmission delay time T may be identified as the received light quantity data.

Figure 15A:
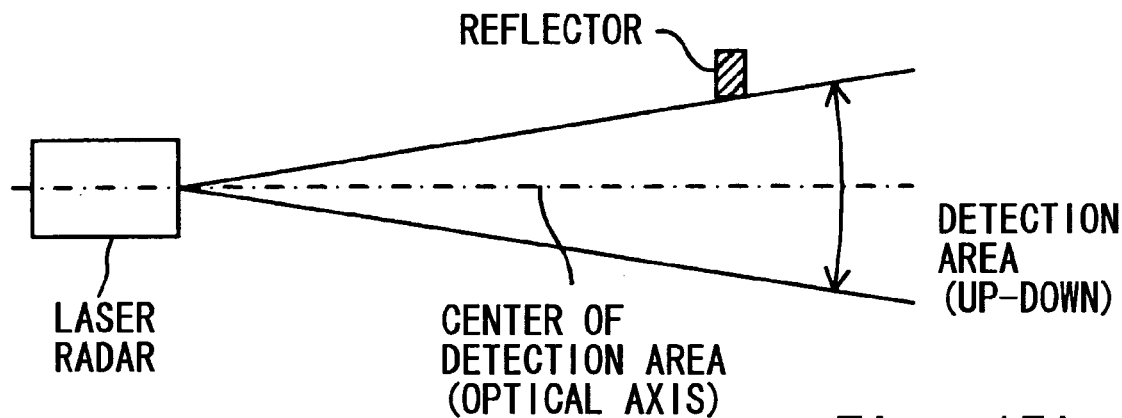
FIGS. 15A and 15B are drawings for showing a conventional method of axial adjustment.
Figure 15B:
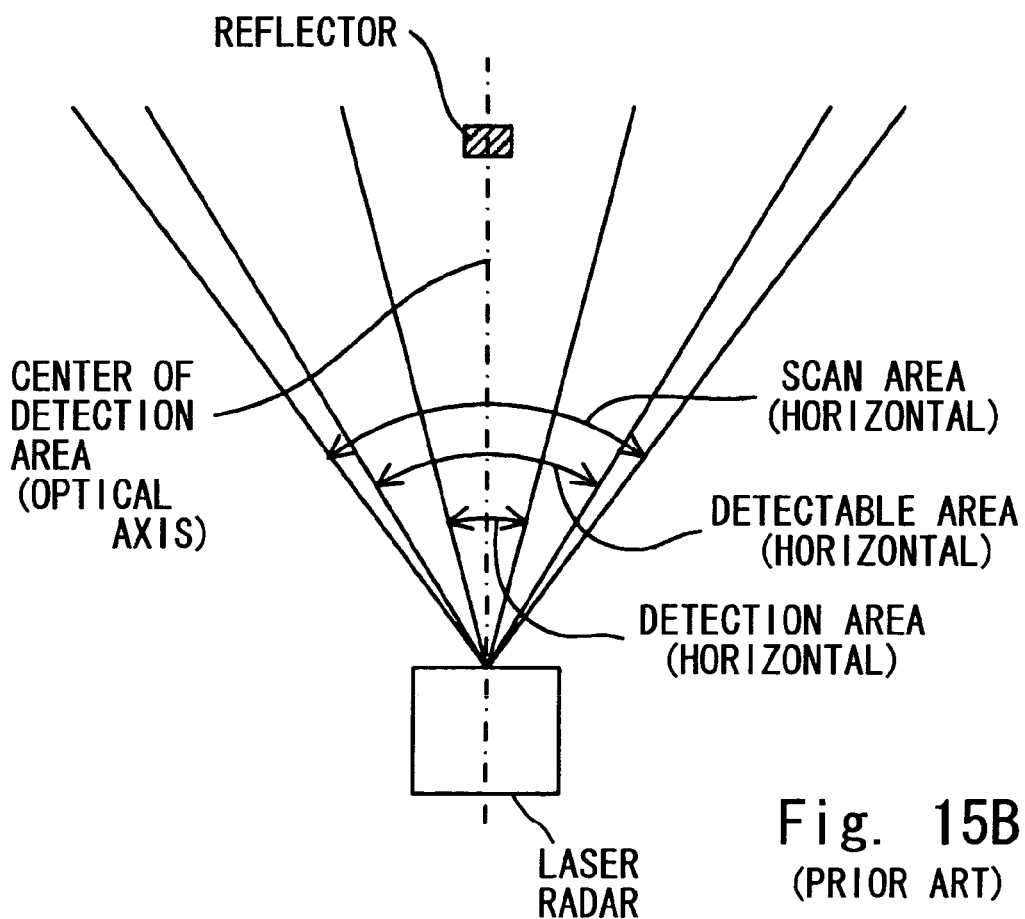

In this example, too, the angular range of the area actually irradiated by the laser light (the scan area) is made larger than the detection area within which reflected light is received for obtaining measured distance data, etc., as explained above with reference to FIG. 15B such that the horizontal (left-right) position of the detection area of the radar 1 (the first detection area) can be adjusted (the axial adjustment of the radar 1 in the standard direction) to a certain extent by changing the position of the detection area inside the scan area (or the detection-permitting area) or a software parameter without physically altering the attachment position of the detection head. Since the radar 1 of this example is a two-dimensional scan radar, its positional adjustment in the up-down direction and in the rolling direction can also be adjusted by a software parameter.

In what follows, this kind of adjustment by changing a parameter will be referred to as a software adjustment and the range in which a software adjustment is possible will be referred to as a software adjustable range. The extent of the detection area by the radar 1 on the plane of the detection surface of the target 3 for adjustment will be referred to as the radar field of vision, as shown in FIG. 2C.

Figure 3A:
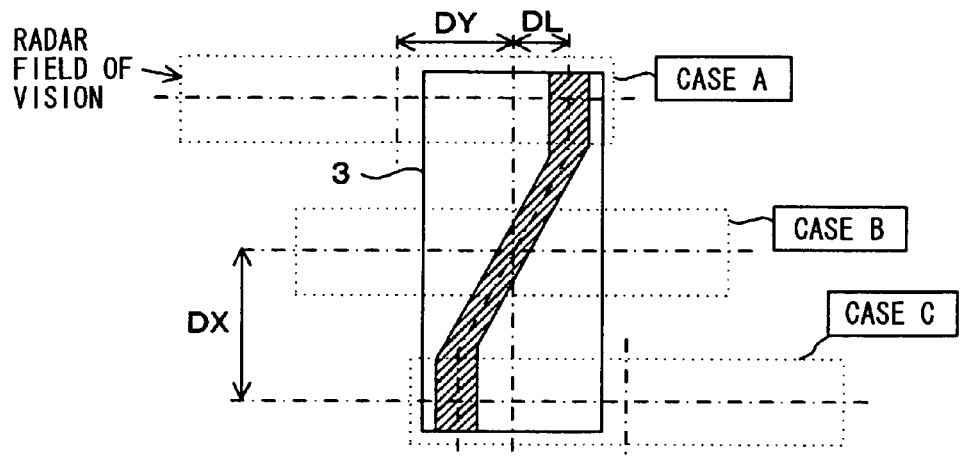
FIGS. 3A, 3B, 3C and 3D, together referred to as FIG. 3, explain the waveform of received radar light, FIG. 3A showing the front view of a target, FIGS. 3B, 3C and 3D showing brightness-darkness patterns.

Next, the axial adjustment procedure to be carried out by using the equipment described above will be explained. This adjustment is carried out with the vehicle carrying the radar 1, etc. kept stationary and by setting a target 3 as shown in FIG. 2C or FIG. 3A in front of the vehicle such that its standard (left-right) direction matches the direction which the standard (horizontal) direction of the radar 1 should be. The environmental condition is prepared such that there will be no reflected light and then the aforementioned inputting means is operated to carry out the axial adjustment (to be described below with reference to FIG. 10).

FIG. 2C shows the design of the target 3 for adjustment, having a rectangular detection surface having a pair of mutually parallel vertical edges on the right-hand and left-hand sides. The width L1 between the right-hand and left-hand side edges is less than the width L2 of the field of vision of the laser radar. The vertical extension of the detection surface of the target 3 (no symbol) is set about equal to the maximum positional displacement of the radar field of vision in the vertical direction. In other words, the height of the target 3 is determined such that when the radar field of vision is displaced upward by a maximum amount, it will be as shown as Case A in FIG. 3A and when the radar field of vision is displaced downward by the maximum amount, it will be as shown as Case C in FIG. 3A.

On the detection surface of the target 3, there is a belt-like region 21 crossing its center part diagonally with respect to the vertical direction. Inversion areas 22 and 23 are formed on the right-hand and left-hand sides of this belt-like region 21 and vertically extending regions 25 and 26 are formed on the upper and lower sides of the diagonal belt-like region 21. The diagonal belt-like region 21 and the vertically extending regions 25 and 26 have a low reflectivity, say, by being painted in black. The inversion areas 22 and 23 are bright areas, say, by being painted in white and having a high reflectivity.

Figure 3B:
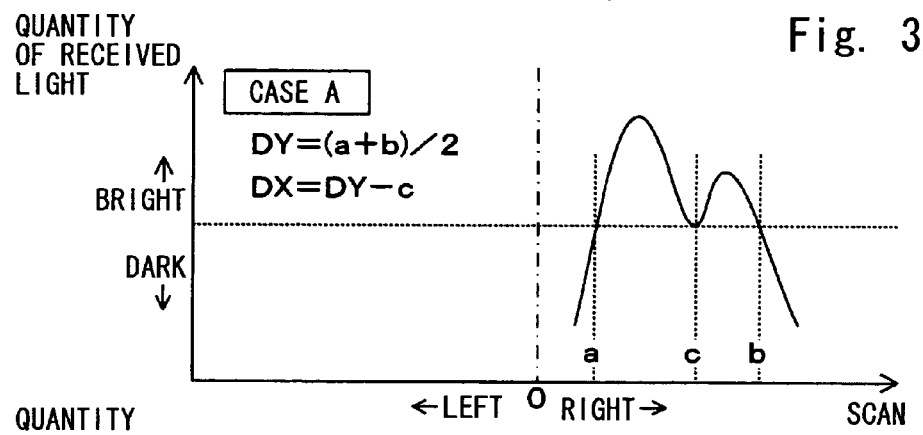
Figure 3C:
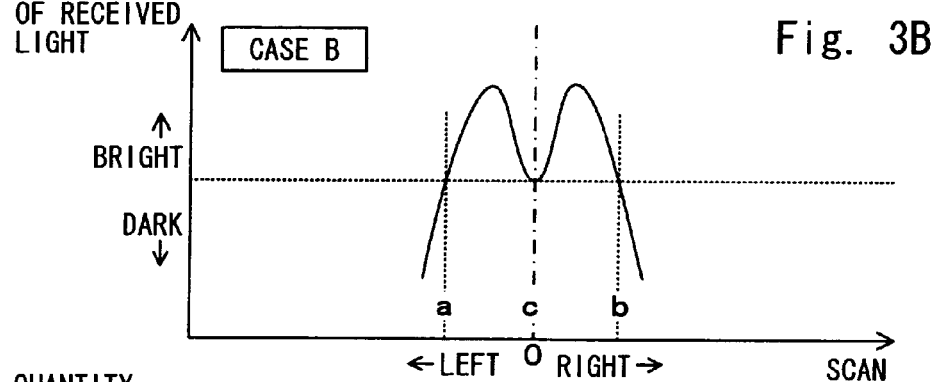
Figure 3D:
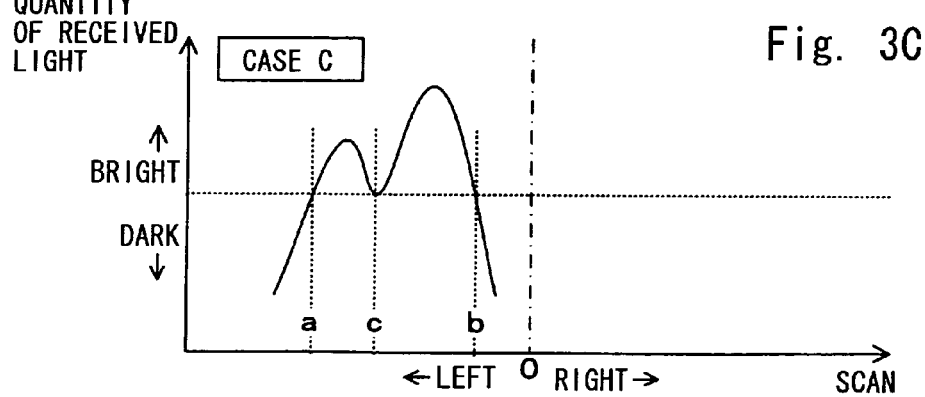

If a target 3 having such a pattern is used with its detection surface facing the detection area of the radar 1, the waveform of the received intensity of the reflected light (the quantity of received light) will have an inverted W-shape as shown in FIGS. 3B, 3C and 3D, corresponding to the brightness-darkness pattern on the detection surface of the target 3. From this waveform, the axial displacement of the detection area can be calculated both in the up-down and left-right directions.

Explained more in detail, use is made of the scan quantity c corresponding to the central valley of the inverted W-shape and scan quantities a and b corresponding to a pair of points on both sides of the central valley having the same light intensity as at the central valley point to obtain the displacement in the standard direction of the center point of the radar field of vision from the center position of the target 3 as $DY=(a+b)/2$ and the displacement in the perpendicular direction as $DX=DY-c$.

To explain the above further in detail, the aforementioned waveform of the inverted W-shape comes about because the quantity of received light drops at the positions of the dark belt-like regions 21, 25 and 26 and rises at the bright inversion areas 22 and 23 on both sides, dropping further outside the outer edges of these inversion areas 22 and 23. Thus, the average $(a+b)/2$ of the scan quantities a and b corresponding to points where the received light quantity becomes equal to that at the bottom of the central valley corresponds to the position data of the center position CP in the left-right direction (the standard position) on the detection surface of the target 3. Thus, this average value (or the product of this average value and a specified number) may be treated as representing the center (in the left-right direction) of the displacement DY and the target 3.

When the displacement DY in the standard direction is equal to zero as in Case B shown in FIG. 3C, this means that the center position CP of the detection surface of the target 3 matches the zero position of the scan quantity (the standard direction position of the optical axis of the radar 1), or $DY=CP=0$, or that the optical axis of the radar 1 is at the right position in the standard direction. If the displacement DY in the standard direction is positive as in Case A shown in FIG. 3B, this means that the center position in the left-right direction of the target 3 is on the right-hand side of the center of the radar field of vision, or that the optical axis of the radar 1 at the center of its field of vision is displaced to the left. Likewise, if DY is negative as in Case C shown in FIG. 3D, this means that the optical axis at the center of the radar field of vision is displaced to the right.

Since the aforementioned scan quantity c corresponds to the position in the standard direction of the central line of the belt-like regions 21, 25 and 26, the difference (DY−c) between the displacement DY corresponding to the center position CP of the detection surface and this scan quantity c corresponds to distance DL shown in FIG. 3A from the center position of the detection surface in the left-right direction to where the center line of the belt-like regions 21, 25 and 26 is. Because the belt-like region 21 is tilted from the up-down direction, distance DL is proportional to the displacement DX in the perpendicular direction of the radar field of vision in the up-down direction. Thus, (DY−c) or a value obtained by multiplying this with a specified multiplicative factor may be regarded as representing the displacement in the perpendicular direction.

When the perpendicular displacement DX is zero as in Case B shown in FIG. 3C, this means that the center position of the detection surface of the target 3 in the up-down direction matches the up-down position of the optical axis of the radar 1 and that the optical axis of the radar 1 is at a right up-down position. If the displacement DX in the up-down direction is negative as in Case A shown in FIG. 3B, this means that the center position in the up-down direction of the target 3 is below the center of the radar field of vision, or that the optical axis of the radar 1 at the center of its field of vision is displaced upward. Likewise, if DX is positive as in Case C shown in FIG. 3D, this means that the optical axis at the center of the radar field of vision is displaced downward.

Since the upper and lower belt-like regions 25 and 26 are not diagonally tilted, DL in these regions does not vary in proportion with the displacement in the up-down direction of the radar field of vision. Thus, the calculated value of DX becomes somewhat smaller in these regions but since these regions are where the displacement of the radar field of vision in the up-down direction is significantly large, this remains within the limit of error. Alternatively, a correction may be made according to the calculated value of DX and the value of DX may be obtained again thereafter to repeat the correction process once again such that a correct displacement value may be eventually possible and there is no practical problem.

By using the target 3 as described above, the axial displacement of the radar 1 in the direction of rolling (the angular displacement θ) can also be calculated.

Let us assume that the target 3 has been set as described above, although it is not necessary in this case to set the detection surface in front of the radar 1. Next, the radar 1 is scanned only in the standard direction and the center position CP1 in the left-right direction of the detection surface is obtained as explained above. Next, the detection area of the radar 1 (or the radar field of vision) is changed either by scanning the radar 1 in the perpendicular direction or by changing the angle of its attachment and the center position CP2 in the left-right direction of the detection surface is obtained again by repeating the same procedure.

Figure 16A:
FIGS. 16A, 16B, 16C and 16D are drawings for explaining the step of axial adjustment of the radar in the direction of rolling.
Figure 16B:
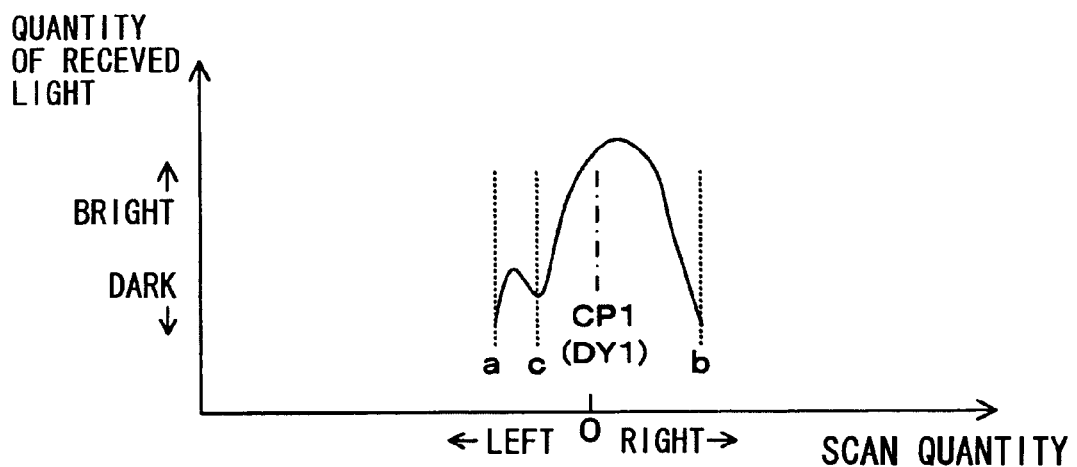
Figure 16C:
Figure 16D:
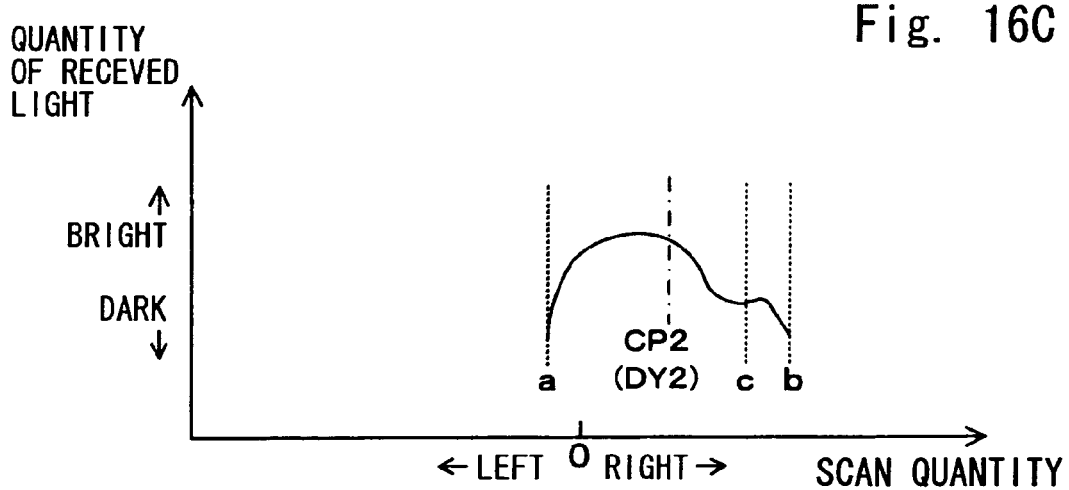

FIG. 4A shows an example of the procedure outlined above. First, measurements are taken by scanning in the standard direction in the initial detection area (radar field of vision A) and the center position in the left-right direction CP1 is obtained. FIG. 16A is the pattern seen within the detection area by this scan and the waveform of the reflected light is as shown in FIG. 16B. The center position CP1 is obtained from this waveform in terms of the displacement (a+b)/2 in the standard direction, as explained above. Next, the detection area is moved in the perpendicular direction as shown in FIG. 4A and a new center position in the left-right direction CP2 is obtained similarly. In this case, the pattern seen within the new detection area is as shown in FIG. 16C and the waveform of the reflected light is as shown in FIG. 16D. The center position CP2 is obtained from this waveform similarly as (a+b)/2. The center position CP1 corresponds to the displacement in the standard direction DY (DY1) in the initial radar field of vision A and the center position CP2 corresponds to the displacement in the standard direction DY (DY2) in the shifted radar field of vision B.

The magnitude and direction of the angular displacement θ in the direction of rolling can be calculated from the difference between CP1 and CP2, or the change in the center position in the left-right direction of the detection surface as seen from the radar 1. If the angular displacement θ is defined as shown in FIG. 4A and if it is assumed that the detection area of the radar 1 was shifted in the upward direction, a shift of the center position of the target 3 to the right leads to the judgment that the angular displacement θ is in the clockwise direction. FIG. 4B shows the relationship between the direction of the angular displacement and the left-right direction in which the center of the target shifts when the radar is moved upward or downward. Since the change in the position of the detection area of the radar 1 in the up-down direction (ΔX) and in the left-right direction (ΔY=CP2−CP1) are related by the formula ΔY=ΔX tan θ, the angular displacement θ can also be obtained quantitatively by using this relationship.

Next, the operations by the monitor for adjusting its optical axis are explained according to the control process routine. As a command to execute the axial adjustment is outputted, the control system including the control circuit 17 and the judging part 4 (or a personal computer connected externally) serves to execute a control process shown, for example, by the flowchart of FIG. 10.

To start, the radar 1 and the camera 2 are operated for a specified number of times to check adjustability. For example, it is determined whether the distance to the target object measured by the radar 1 is within a specified range or not and if it is found to be outside such range, optical axis adjustability data B indicating that the adjustment is not possible are outputted. It is also determined whether the image of a preliminarily set target is included in the image taken by the camera 2 and if it is not, optical axis adjustability data A are outputted to indicate that the target 3 is not set and the adjustment cannot be carried out (Step S1). In Step S2, it is determined if adjustability data B have been outputted. In Step S3, it is determined if adjustability data A have been outputted. If neither of them has been outputted (YES in either Step 2 or Step 3), the process proceeds to Step S4. If otherwise (NO in both Step 2 and Step S3), the process proceeds to Step S12.

In Step S4, a subroutine (to be described below) for axial adjustment for the radar 1 is executed and the process proceeds to Step S5 wherein it is determined whether the angular displacement θ of the radar 1 in the rolling direction has been calculated (in Step S30, to be described below) and the process proceeds to Step S6 or S13, depending on whether the calculation has been done or not, respectively.

In Step S6, the axial adjustment of the radar 1 in the rolling direction is carried out according to the calculated angle by changing a parameter by software operation to adjust its detection area. The adjustment in this step may be alternatively carried out physically by changing the angle of attachment of the radar 1 manually or by a mechanical means.

Next, in Step S7, the camera 2 is operated and its optical axis is recognized (as will be explained more in detail below) on the basis the image data of the target 3 obtained thereby and the distance data (distance DLT to the target 3) obtained in Steps S1 and S4. The data obtained in Step S7 on the displacement of the optical axis of the camera 2, such as external parameters (to be described below) and the values of the angles based on these external parameters are displayed on a display device (Step S8).

Next, in Step S9, it is determined whether the axial adjustment of the camera 2 has been completed, or whether its angular displacement has come to within a specified range. If it is completed (YES in Step S9), the process is finished through Step S14. If it is not completed (NO in Step S9), a demand for its adjustment is switched on (Step S10), say, by displaying a demand to the user that the orientation of the optical axis of the camera 2 be corrected physically. After the change in the optical axis of the camera 2 is acknowledged (Step S11), the process returns to Step S9.

In Step S12, it is displayed that the adjustment is not possible and the process returns to Step S1. In Step S13, since the angular displacement θ has not been calculated, the position of the radar 1 in the perpendicular direction is changed and the measurements by a scan in the standard direction are repeated and the angular displacement θ is calculated by the method described above. In Step S14, the demand for axial adjustment is switched off if it has been switched on in Step S10.

Next, the subroutine to be carried out in Step S4 for the axial adjustment of the radar 1 is described in detail. As this subroutine is started, the radar 1 is scanned in the standard direction to take measurements for generating a waveform of the quantity of received light reflected from the target 3 as well as from its environment (Step 21) and the aforementioned scan quantities a, b and c are obtained from this waveform (Step S22).

Next, in Step S23, the condition of a flag to be describe below (Step S37) is checked and, if it is switched off (NO in Step S23), the values of the scan quantities obtained in Step S22 are used to calculate DY and CP (Step S24) and DX (Step S25) as explained above. It is then checked whether the value of DY thus calculated is within an allowable range (Step S26) and the process proceeds to Step S27 if it is within the allowable range and to Step S32 if otherwise. In Step S27, a demand for adjustment (to be explained below with reference to Step S34) is switched off and then it is determined whether the value of DX obtained in Step S25 is within an allowable range (Step S28). If DX is within the allowable range (YES in Step S28), the process is completed. If not (NO in Step S28), the process proceeds to Step S36).

In Step S29, the value of CP obtained in Step S24 in the previous sequence is kept (CP1) and a new value (CP2) is obtained from the values of the scan quantities obtained immediately before in Step S22. Thereafter, the angular displacement θ in the rolling direction of the radar 1 is calculated as explained above from the values of CP1 and CP2 and the change ΔX stored in Step S37 (to be described below) (Step S30). The flag which was switched on in Step S37 in the previous sequence is switched off (Step S31) and the process proceeds to Step S25.

If DY is found not to be within the specified allowable range in Step S26, it is examined whether DY is within the software adjustable range defined above (Step S32). If DY is within this range (YES in Step S32), the displacement DY in the standard direction is adjusted by software (Step S33). If otherwise (NO in Step S32), a demand for adjustment of DY by physical means is made on the display together with the data on the displacement (Step S34). This demand need not be for the user to perform the adjustment. A mechanism for mechanically changing the angle of attachment for the radar 1 may be provided such that the adjustment can be effected automatically.

In Step S35, a judgment as done in Step S28 is made and if DX is within the allowable range (YES in Step S35), the process returns to Step S21 to repeat the sequence. Otherwise (NO in Step S35), the displacement DX in the perpendicular direction is corrected by software means. Alternatively, steps similar to Steps S32 and S34 described above may be provided such that DX may be corrected also by physical means, if necessary.

Thereafter, in Step S37, the change in the position in the perpendicular direction ΔX is stored and the aforementioned flag related to the adjustment in the up-down direction is switched on.

Figure 9:
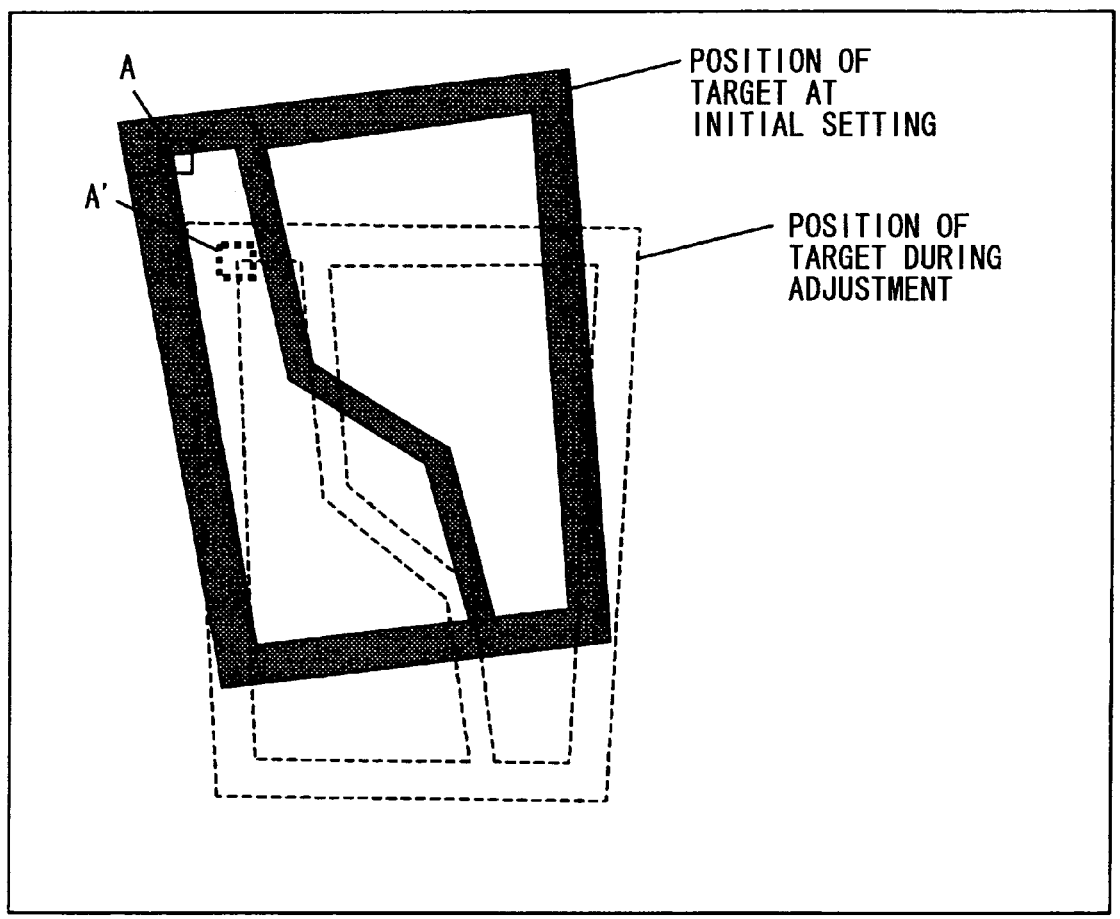
FIG. 9 is a drawing for explaining a process for referencing a characteristic point of a target on an image.
Figure 10:
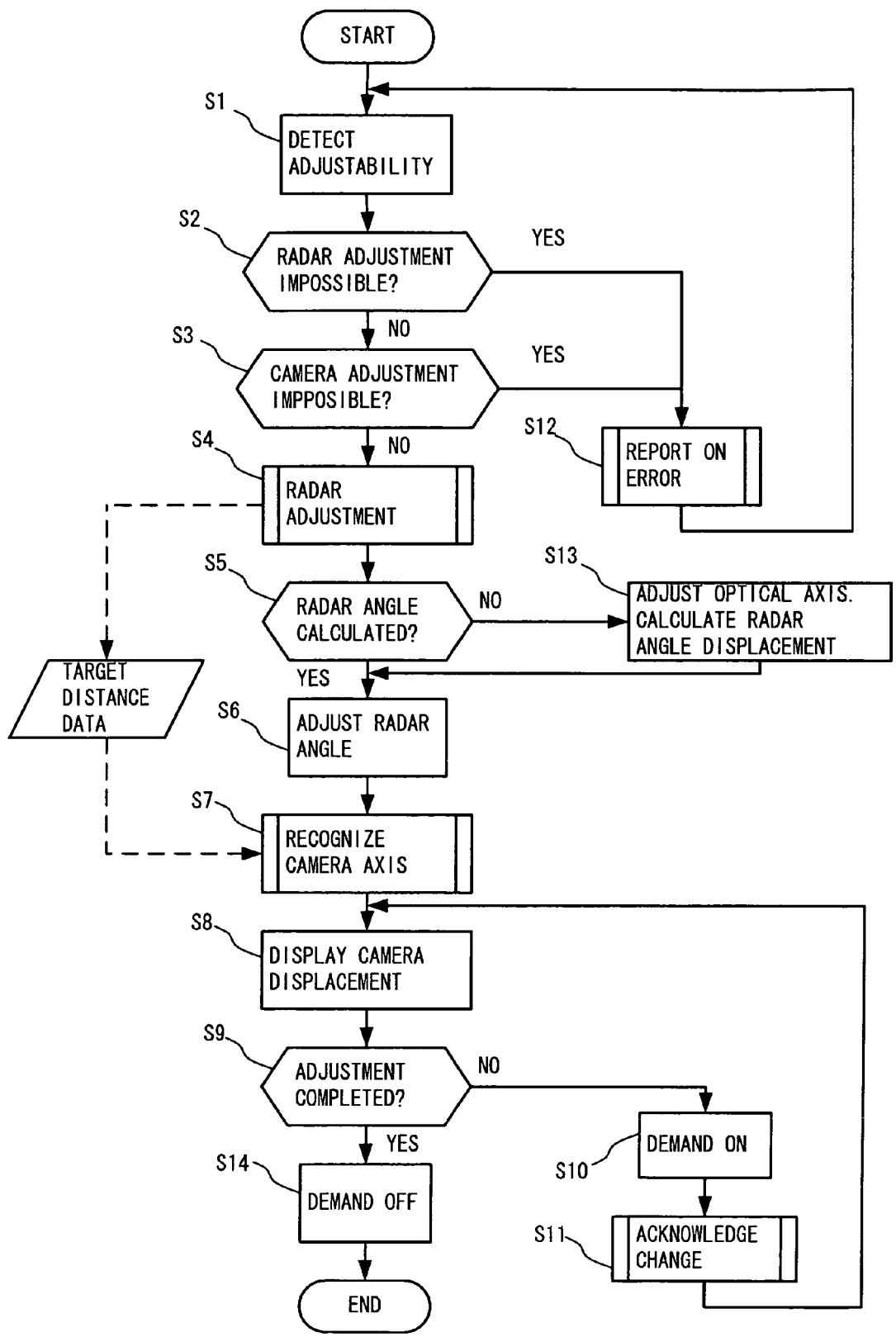
FIG. 10 is a flowchart of a main routine for the axial adjustment process.
Figure 11:
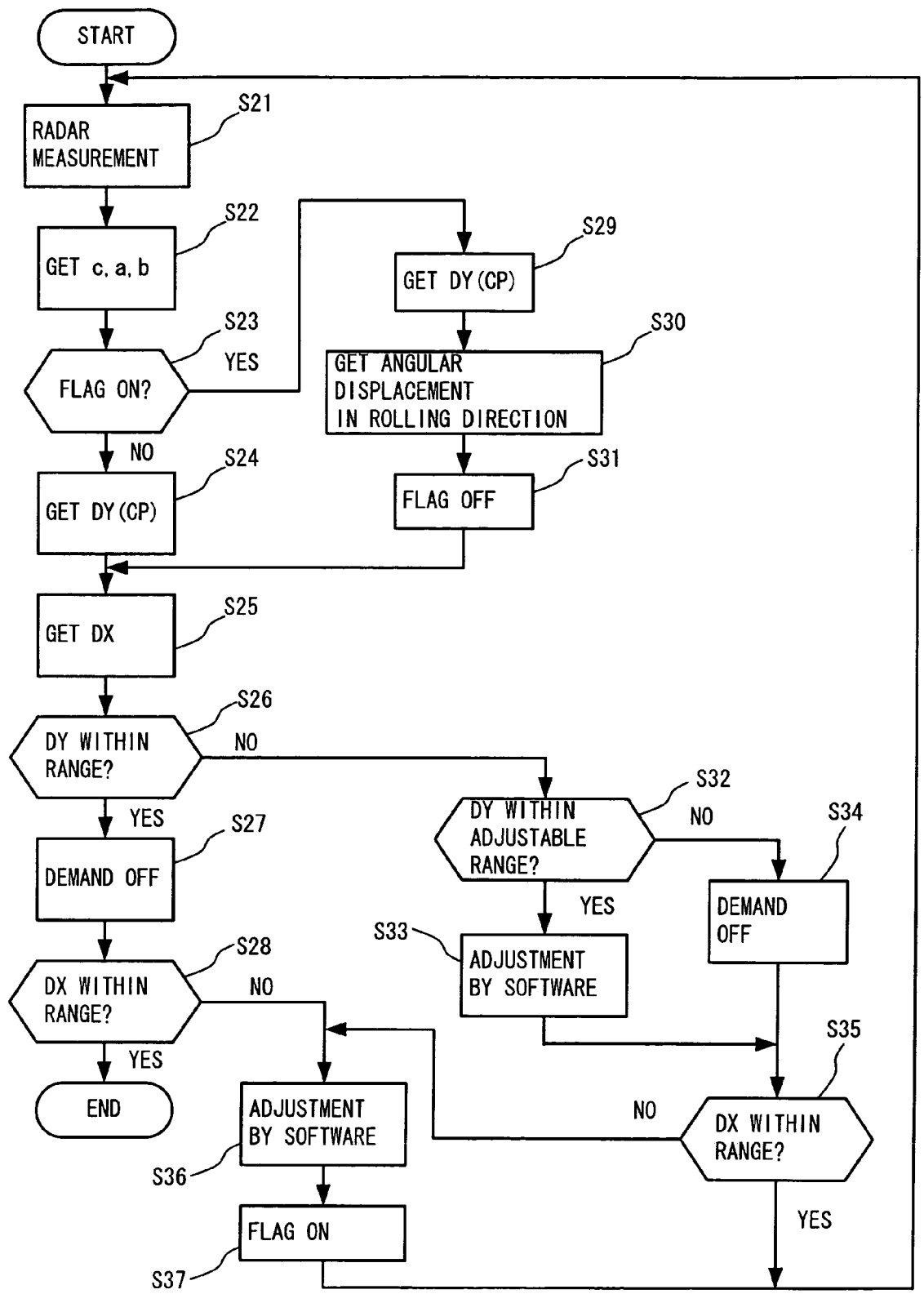
FIG. 11 is a flowchart of a subroutine used in the main routine of FIG. 10.

Next, FIGS. 5-8 will be referenced to explain the principle of recognition (determination) of the optical axis of the camera 2 in Step S7 of FIG. 10. Although a target different from the target 3 shown in FIGS. 2C and 3A is used in the example shown in FIGS. 5-9, both targets are functionally the same. In reality, a same target may be used for the axial adjustment of both the radar 1 and the camera 2.

Figure 5:
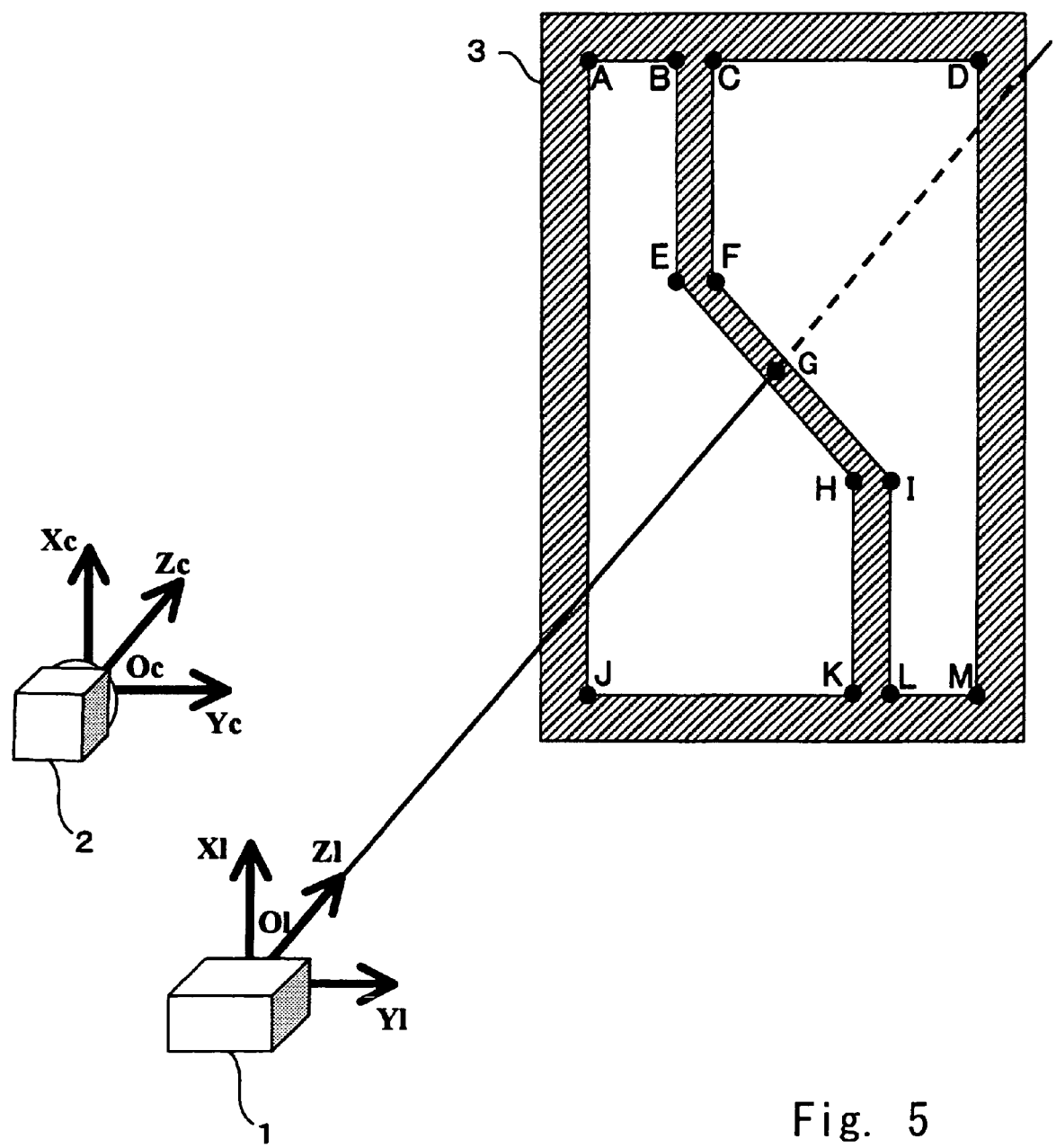
FIG. 5 shows the characteristic points of a target and coordinate systems of sensors.

By the time this process is started, it is understood that the adjustment of the optical axis of the radar 1 has been completed inclusive of the adjustment in the rolling direction. Thus, a radar-fixed coordinate system (X1, Y1, Z1) is defined as shown in FIG. 5 such that the Z1-axis along the optical axis of the radar 1 passes through the center point G of the target 3 and the X1-Y1 plane is parallel to the detection surface of the target 3. The distance DLT between the radar 1 (the origin O1 of the coordinate system) and the target 3 (or its center point G) is already measured and since the design of the target 3 is known, the coordinates of each of characteristic points A-M on the target 3 are known data. Thus, if the coordinates of these characteristic points A-M in a camera-fixed coordinate system (Xc, Yc, Zc) are determined, it is possible to determine the positional relationship of the optical axis of the camera 2 with respect to the optical axis of the radar 1.

Cameras generally require corrections (coordinate transformations) on the data obtained from images taken thereby because of the distortions in the lens of the optical system. In order to simplify the description of the present invention, however, it will be assumed herein that there is no such distortion. A lens distortion coefficient which is a parameter related to the lens distortion can be easily obtained by a conventional method of setting in front of the camera at a specified distance a square target with a lattice pattern on its surface. Thus, it is preferable to preliminarily measure such a parameter for each camera 2.

The relationship between the coordinates (Xw, Yw, Zw) of a point M with reference to a specified three-dimensional system and the two-dimensional coordinates (u, m) of corresponding point m on the image of point M taken by a camera may be expressed by Formula (1) given below:

$$s\tilde{m} = A[R \ t]\tilde{M} \ \tilde{m} = \begin{bmatrix} u \\ v \\ 1 \end{bmatrix}, \tilde{M} = \begin{bmatrix} Xw \\ Yw \\ Zw \\ 1 \end{bmatrix} \quad \text{Formula (1)}$$

In Formula (1), scale s is a coefficient and A is a 3×3 matrix representing an inner parameter of the camera. R and t are respectively a 3×3 and 3×1 matrix, being an external parameter of the camera, representing its six degrees of freedom in space, R represents its rotational components and t its translational components. If the coordinate system (Xw, Yw, Zw) is considered to be the radar-fixed system (X1, Y1, Z1) to define the camera-fixed system (Xc, Yc, Zc) as shown in FIG. 5, matrix R is a parameter corresponding to the relative angular displacement between the radar-fixed system (X1, Y1, Z1) and the camera-fixed system (Xc, Yc, Zc) or the degree of disagreement between the optical axes of the radar 1 and the camera 2. Matrix t is a parameter corresponding to the difference between the positions of the radar 1 and the camera 2. In the example of FIG. 1A, the camera 2 is vertically above the radar 1. This type of positional difference is reflected in matrix t.

Next, it will be explained how to obtain matrix A serving as an internal parameter. Matrix A is a constant, depending upon the type of the camera and may appear as shown below:

$$A = \begin{bmatrix} \alpha & \gamma & cu \\ 0 & \beta & cv \\ 0 & 0 & 1 \end{bmatrix} \quad \text{Formula (2)}$$

In Formula (2), (cu, cv) represents the origin (usually the center point) of the image coordinate system, α and β are scale elements of the image coordinate axes (u, v) and γ is the distortion of the u-axis and the v-axis.

Formula (1) may be rewritten as follows by replacing matrices A, R and t with single matrix P:

$$s\tilde{m} = P\tilde{M} \quad \text{Formula (3)}$$

This shows that if the three-dimensional coordinates of point M and matrix P are known, the point on the image surface which is its projection can be expressed as a multiple of scale s. Scale s is determined on the basis of the distance between point M and the camera (a value corresponding to DLT). P is a 3×4 matrix and is commonly referred to as the projective matrix. The coordinate transformation parameter between the radar 1 and the camera 2 can be obtained in the case of the present example from projective matrix P on the basis of the coordinates of the characteristic points of the target 3 and coordinates on the surface of the image taken by the camera.

Formula (3) may be transformed into Formulas (4) shown below:

$$Zp = 0$$

$$p = [p_{11} \ p_{12} \ \Lambda \ p_{34}]^T \quad \text{Formulas (4)}$$

In the above, Z is a 2×12 matrix formed with three-dimensional point M and two-dimensional point m, and p is a camera parameter with projective matrix P rearranged in the form of a vector. This camera parameter p can be obtained as an optimization problem shown by Formula (5) if three-dimensional point M and two-dimensional point m are known:

$$\|Zp\|^2 \to \min, \|p\|^2 = 1 \quad \text{Formula (5)}$$

Once vector p is solved for, this is rearranged into projective matrix P, and projective matrix P is divided into a 3×3 matrix and a 3×1 matrix as shown in Formula (6):

$$P = \begin{bmatrix} p_{11} & p_{12} & p_{13} & | & p_{14} \\ p_{21} & p_{22} & p_{23} & | & p_{24} \\ p_{31} & p_{32} & p_{33} & | & p_{34} \end{bmatrix} = [AR \ | \ At] \quad \text{Formula (6)}$$

As can be understood from Formula (1), the portion of the 3×3 matrix is the product of matrices A and R (or matrix AR) and the portion of the 3×1 matrix is the product of matrices A and t (or matrix At). Thus, this 3×3 matrix can be decomposed into an orthogonal matrix and an upper triangular matrix by Choleski decomposition and if the upper triangular matrix thus obtained is divided by its (3, 3) element, a matrix A (internal parameter) with the same form as Formula (2) can be obtained.

Since this matrix A (internal parameter) is determined by the kind of the camera 2 itself, it is not necessarily required to be obtained from the data on the target 3 in Step S7 of FIG. 10. Normally, it may be obtained preliminarily for each type of camera or for each camera. For example, the same target may be used to obtain this matrix A in the aforementioned process of obtaining the camera distortion.

Next, a method of obtaining the external parameter (Rt) is explained. This external parameter, too, can be obtained with the same idea of obtaining the projective matrix P except this external parameter is obtained by using the same target 3 in Step S7 of FIG. 10 after the optical axis of the radar 1 is adjusted. In this way, the external parameter which comprises the coordinate conversion parameter between the optical axes of the radar 1 and the camera 2 can be obtained easily and more accurately.

As explained above, the coordinates of the characteristic points A-M on the target 3 with respect to the radar-fixed system (X1, Y1, Z1) can be obtained easily as shown below:

$$(X1, Y1, Z1) = (x1_A, y1_A, Dlt), (x1_B, y1_B, Dlt), (x1_C, y1_C, Dlt), \ldots, (x1_M, y1_M, Dlt) \quad \text{Formula (7)}$$

Next, the coordinates of the characteristic points A-M (hereinafter excepting the center point G) on the image surface are obtained. This may be done by processing the image of the target 3 (including the edge extraction, corner extraction and binarization processes) but the process may be simplified as follows.

Figure 6:
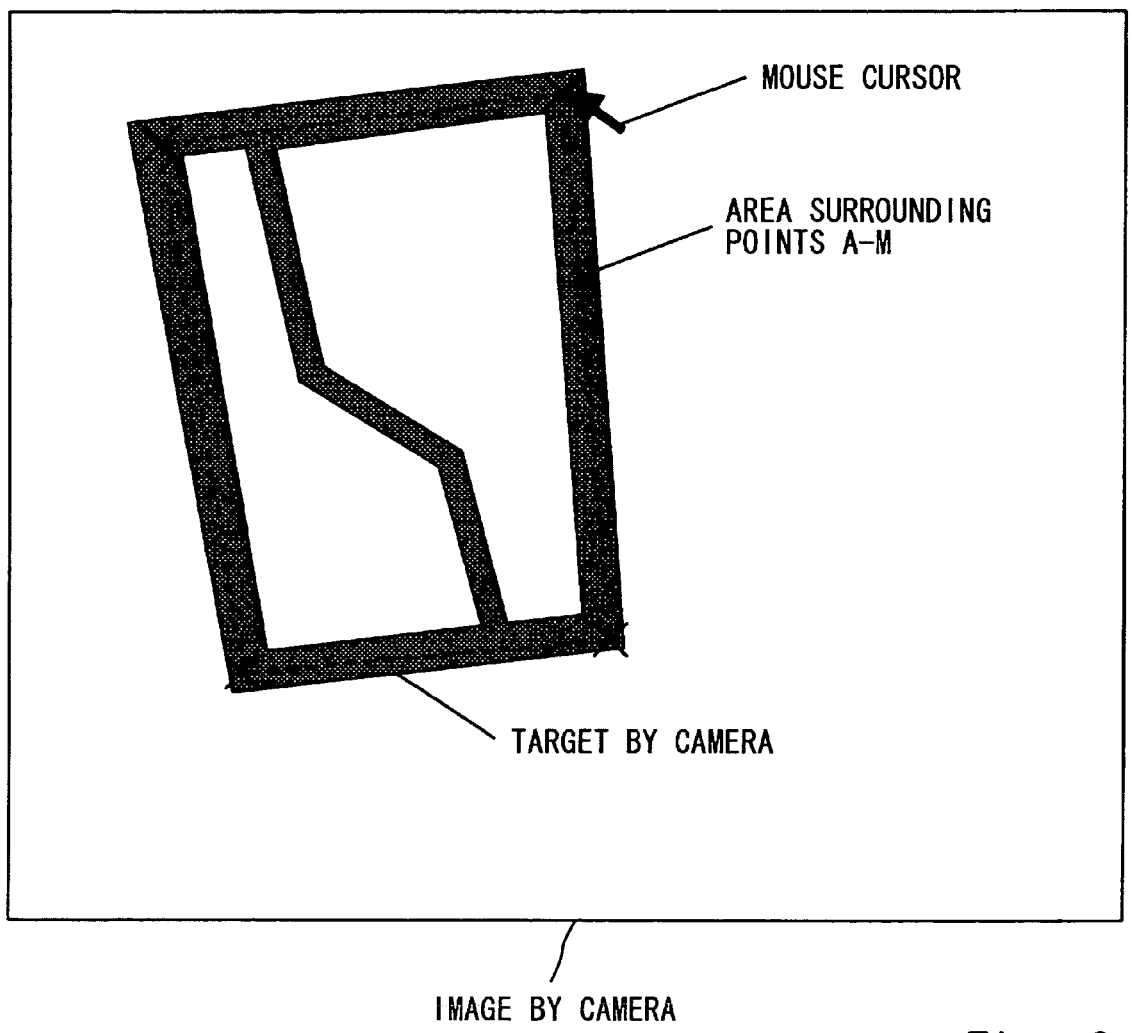
FIG. 6 is an example of an image of the target.
Figure 7A:
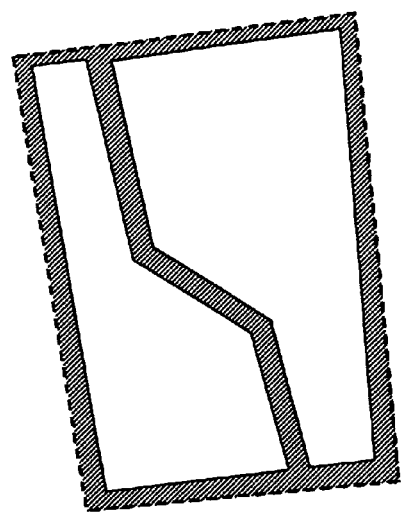
FIGS. 7A, 7B and 7C, together referred to as FIG. 7 and FIGS. 8A and 8B, together referred to as FIG. 8 are drawings for explaining a process for extracting characteristic points of the target.

The image of the target 3 taken by the camera 2 may appear as shown in FIG. 6. A demand is outputted for the user to specify the positions of the four corners that will surround the characteristic points A-M such that the area inside these specified four corners is cut out as shown in FIG. 7A. This process may be carried out by taking the image of the target 3 into a personal computer connected to the monitor and by using a mouse (as shown in FIG. 6).

Figure 7B:
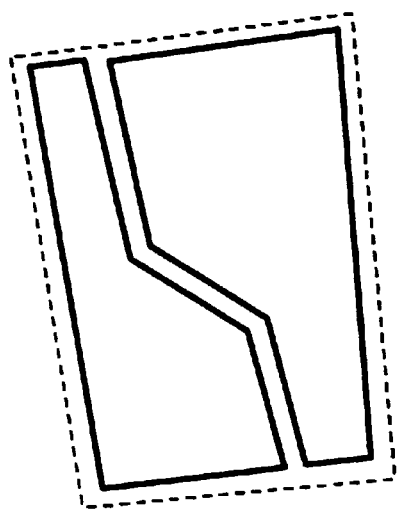
Figure 7C:
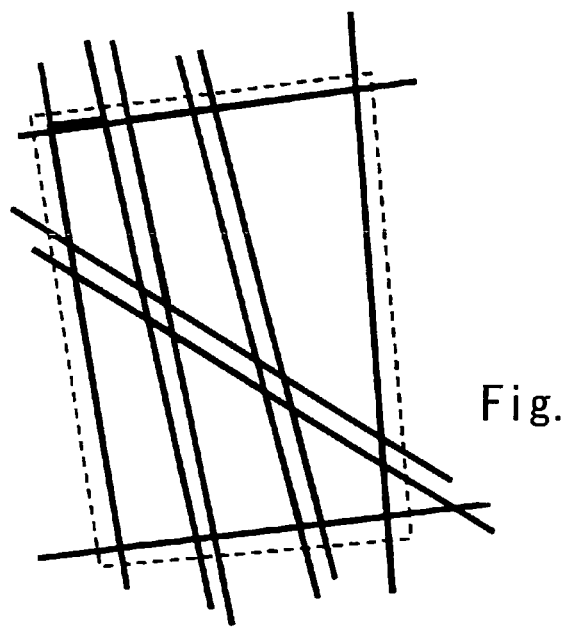
Figure 8A:
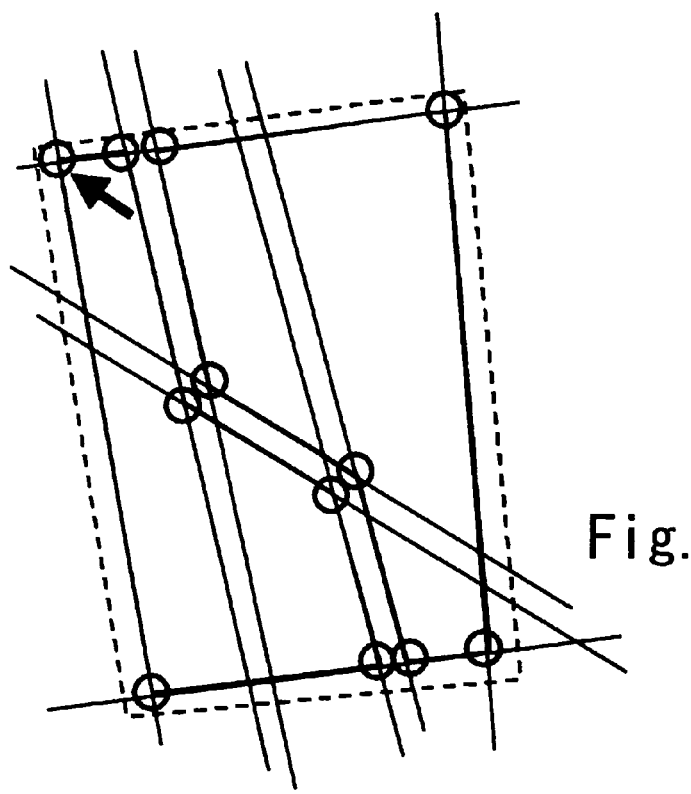
Figure 8B:
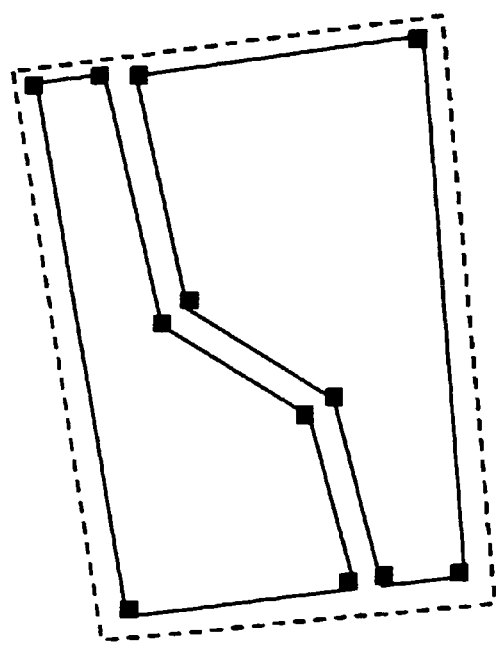

Next, an edge filtering process of a known kind is carried out on the image data thus cut out to generate an edge image as shown in FIG. 7B. Next, the known method of Hough transformation is carried out for extraction of straight lines as shown in FIG. 7C and their crossing points are identified. Of these crossing points, those corresponding to the characteristic points A-G are selected as indicated by circles in FIG. 8A. The coordinates of these points are registered as coordinates of the characteristic points A-M. They are shown as black squares in FIG. 8B. Formula (8) shows these coordinate values:

$$(u, v)=(u_A, v_A), (u_B, v_B), (u_C, u_C), \ldots, (u_M, v_M) \quad \text{Formula (8)}$$

Next, the projective matrix P shown in Formula (3) is obtained for the target 3. In other words, a projective matrix for determining the relationship between the three-dimensional coordinate values of the characteristic points A-M given by Formula (7) and their two-dimensional coordinate values shown by Formula (8) is obtained. The method may be the same as that for obtaining the matrix A (internal parameter). External parameters (matrices R and t) are extracted from this projective matrix P thus obtained. This may be done as Formula (9) from the relationship of Formula (6):

$$\begin{cases} R = A^{-1} \cdot \begin{bmatrix} p_{11} & p_{12} & p_{13} \\ p_{21} & p_{22} & p_{23} \\ p_{31} & p_{32} & p_{33} \end{bmatrix} \\ t = A^{-1} \cdot \begin{bmatrix} p_{14} \\ p_{24} \\ p_{34} \end{bmatrix} \end{cases} \quad \text{Formula (9)}$$

In the above, $A^{-1}$ indicates the inverse of matrix A. By the above, the external parameter based on the target 3, that is, the external parameter of the radar 1, can be obtained.

Next, the principle of process for recognizing the change (orientation only) in the optical axis of the camera 2 (Step 11 of FIG. 10) will be explained with reference to FIG. 9. The rotation matrix R of the external parameter can be expressed in terms of rotations around each axis of the camera-fixed coordinate system. If the detection area of the camera 2 rotates by $\theta$ around the Zc-axis, by $\phi$ around the Xc-axis and by $\rho$ around the Yc-axis, the rotation matrix R will be as shown by Formulas (10) given below:

$$R_t = \begin{bmatrix} r_{11} & r_{12} & r_{13} \\ r_{21} & r_{22} & r_{23} \\ r_{31} & r_{32} & r_{33} \end{bmatrix} \begin{array}{l} r_{11} = \cos\theta_t \cos\rho_t \\ r_{21} = -\sin\theta_t \cos\rho_t + \cos\theta_t \sin\phi_t \sin\rho_t \\ r_{31} = \cos\phi_t \sin\rho_t \\ r_{12} = \sin\theta_t \cos\phi_t \\ r_{22} = \cos\theta_t \cos\phi_t \\ r_{32} = -\sin\phi_t \\ r_{13} = -\cos\theta_t \sin\rho_t + \sin\theta_t \sin\phi_t \cos\rho_t \\ r_{23} = \sin\theta_t \sin\rho_t + \cos\theta_t \sin\phi_t \cos\rho_t \\ r_{33} = \cos\phi_t \cos\rho_t \end{array} \quad \text{Formulas (10)}$$

If this is compared with the elements of Formula (8), it is possible to obtain the angles $\theta$, $\phi$ and $\rho$ of the optical axis of the camera 2 as shown in Formulas (11) given below:

$$\begin{cases} \theta_t = \tan^{-1} \frac{r_{12}}{r_{22}} \\ \phi_t = -\sin^{-1} r_{32} \\ \rho_t = \tan^{-1} \frac{r_{31}}{r_{33}} \end{cases} \quad \text{Formulas (11)}$$

In Step S11 of FIG. 10, the angular change of the optical axis of the camera 3 may be obtained by newly obtaining matrix R and calculating the new angle of the optical axis by using Formula (11) but the angular change of the optical axis may be obtained simply in the following way. As shown in FIG. 9, let us suppose that characteristic point A on the target 3 on the image moved to a new point A' by an angular adjustment. New rotation matrix can be estimated from this positional change of a characteristic point on the image.

Explained more in detail, the camera 2 is activated to take in a series of images periodically from the moment when the judgment in Step S9 becomes NO (when it is determined necessary to adjust the optical axis of the camera 2) until this judgment becomes YES (when the axial adjustment is determined to have been completed). The coordinates of a plurality of characteristic points are obtained each time, and the operation of estimating rotation matrix $R_{t+1}$ corresponding to the angular change from Formulas (12) given below is repeated:

$$R_{t+1} q_t = q_{t+1} \quad \text{Formulas (12)}$$

$$q_t = \begin{bmatrix} u_{t,0} & u_{t,1} & u_{t,n} \\ v_{t,0} & v_{t,1} & \Lambda & v_{t,n} \\ f & f & f \end{bmatrix},$$

$$q_{t+1} = \begin{bmatrix} u_{t+1,0} & u_{t+1,1} & u_{t+1,n} \\ v_{t+1,0} & v_{t+1,1} & \Lambda & v_{t+1,n} \\ f & f & f \end{bmatrix}$$

where $(u_{t,0}, v_{t,0}), \ldots (u_{t,n}, v_{t,n})$ are the coordinates of n-number of characteristic points at time t on the image.

An estimated value of rotation matrix Rt+1 at time t+1 may be obtained by solving the optimization problem given by Formula (13) below:

$$\|R_{t+1} q_t - q_{t+1}\|^2 \to \min \quad \text{Formula (13)}$$

Characteristic points after a move may be referenced by registering the image of an environment of the characteristic points at time t as a template, searching the environment of the characteristic points on the image at time t+1 while referencing with the normalization mutual correlation calculation given by Formulas (14) below and obtaining a position where the value of ssd in Formulas (14) is maximized, thereby identifying the coordinates of the characteristic points after a move:

$$ssd = \frac{\sum_i \{f(u_i, v_i) - \bar{f}\} \cdot \sum_j \{g(u_j, v_j) - \bar{g}\}}{\sqrt{\sum_i \{f(u_i, v_i) - \bar{f}\}^2} \cdot \sqrt{\sum_j \{g(u_j, v_j) - \bar{g}\}^2}} \quad \text{Formulas (14)}$$

$$\bar{f} = \frac{1}{M} \sum_{i=0}^{M-1} f(u_i, v_i), \quad \bar{g} = \frac{1}{M} \sum_{i=0}^{M-1} g(u_i, v_i)$$

where f(u, v) and g(u, v) are the coordinates on the image respectively before and after the move.

After rotation matrix $R_{t+1}$ corresponding to the angular change is thus obtained by an estimate, angular changes in the three directions $\Delta\theta_t$, $\Delta\phi_t$ and $\Delta\rho_t$ can be obtained by Formula (11). With these values of the angular changes, the new orientation $(\Delta\theta_{t+1}, \Delta\phi_{t+1}$ and $\Delta\rho_{t+1})$ of the optical axis of the camera after the move (at time t+1) can be obtained by Formulas (15) given below:

$$\begin{cases} \theta_{t+1} = \theta_t + \Delta\theta_t \\ \phi_{t+1} = \phi_t + \Delta\phi_t \\ \rho_{t+1} = \rho_t + \Delta\rho_t \end{cases} \quad \text{Formulas (15)}$$

In Step S9 of FIG. 10, every time a new orientation of the optical axis of the camera is obtained, this is compared with a specified allowable angle $\epsilon$ and if each angle becomes less than $\epsilon$ at time t+s as shown in Formulas (16), it is judged that the axial adjustment of the camera has been completed:

$$\begin{cases} |\theta_{t+s}| \le \varepsilon \\ |\phi_{t+s}| \le \varepsilon \\ |\rho_{t+1}| \le \varepsilon \end{cases} \quad \text{Formulas (16)}$$

In summary, adjustability by each sensor is determined initially in Steps S1-S3 and S12 and if it is determined that the adjustment is not possible, neither of the adjustments is carried out. Thus, the possibility of carrying out adjustments under an impossible condition can be reliably avoided, Next, in Step S4 (or Steps S21-S37), detection of displacement of the detection area (first detection area) of the radar 1 both in the standard and perpendicular directions and its correction are automatically carried out except, according to the example described above, a display for requesting correction is made if the axial displacement in the standard direction of the radar 1 (in the left-right direction) is outside the allowable range for software adjustment (Steps S32 and S34) and the display to the effect that the displacement is within the software adjustable range is switched off (Steps S26 and S27). Thus, the user can easily correct any displacement outside the software adjustable range by a physical means by observing the display.

When the axial adjustment in the perpendicular direction (the up-down direction) is carried out in Step S4 of FIG. 10 (by software adjustment only), a flag is switched on in Step S37 (and hence YES in Step S23) and the angular displacement $\theta$ is calculated (Steps S29-S31). If the calculation of the angular displacement $\theta$ is not completed, it is detected in Steps S5 and S13 and correction is made thereon in Step S6 by software.

After the axial adjustment is completed on the radar 1, the axial displacement of the camera 2 is detected and corrected in Steps S7-S11 and S14, inclusive of the setting of coordinate conversion parameters. If the axial displacement of the camera 2 with respect to the optical axis of the radar 1 (identified by the rotation matrix R which is the rotational component of the external parameter) is outside an allowable range, a display is made to request a correction by a physical means in Step S10. This request is cancelled (Steps S9 and S14) as this displacement comes to fall within the allowable range and the process is completed. Thus, the user has only to watch the display to change the direction of attachment of the camera 2 to easily correct the axial displacement.

In summary, a two-dimensional axial adjustment of the radar 1 (the first detection area) both in the up-down (perpendicular) direction and the left-right (standard) direction and its axial adjustment in the rolling direction as well as axial adjustment of the camera 3 (the second detection area) in all directions (and in particular the adjustment to make its optical axis parallel to that of the radar 1) can be carried out easily and accurately by using a single target. Thus, accuracy of measurement as a monitoring apparatus can be significantly improved while the time required and the cost for adjustment can be reduced. Moreover, correlation between position data on the target object can be correctly taken between the sensors and the advantage of the fusion type can be fully taken.

When the axial adjustment of the radar 1 is carried out according to this invention, furthermore, the target is provided with a brightness-darkness pattern on its detection surface such that the waveform of the received light intensity will have an inverse W-shape and hence that the displacement of the optical axis can be calculated from such a waveform in all directions inclusive of the direction of rolling. Thus, the axial displacement can be determined both qualitatively and quantitatively and hence an accurate adjustment becomes possible. Even if the laser beam from the radar 1 is wide as shown in FIG. 2C and the resolution of the radar 1 is relatively low, the axial displacement can be measured accurately because the measurement is based on the waveform of the received light, or the continuous variation in the quantity of received light. By the method of aforementioned Japanese Patent Publication Tokkai 2000-75031, for example, axial adjustment cannot be carried out if the resolution of the radar is low.

Figure 12:
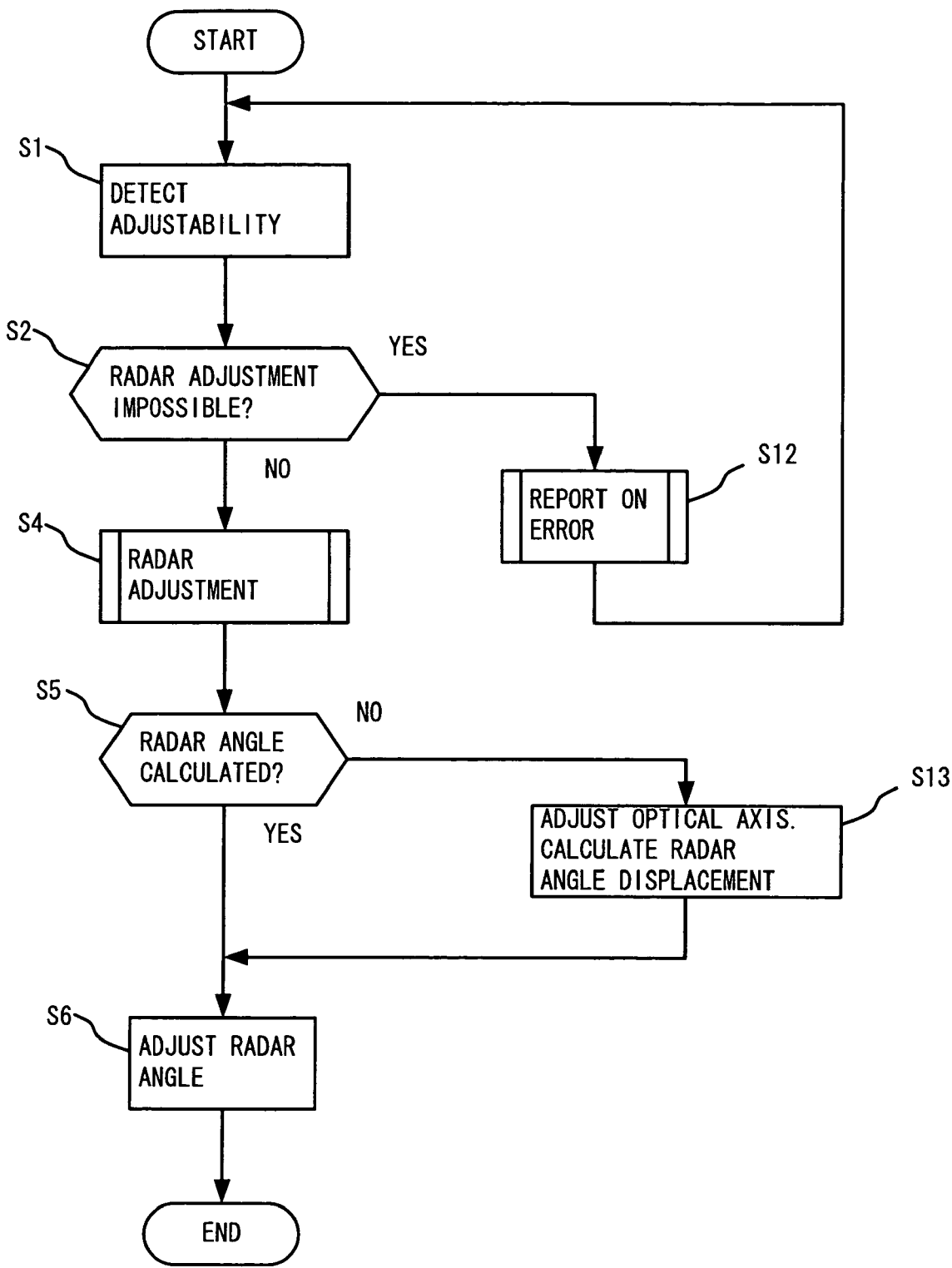
FIG. 12 is a flowchart of another routine for the axial adjustment process.

The invention is not limited by the example described above. Many modifications and variations are possible within the scope of the invention. For example, the first method of axial adjustment according to this invention (the axial adjustment in the direction of rolling) need not be applied to a monitoring apparatus of the so-called fusion type but is also applicable to a monitoring apparatus using only a single radar. In such an application, the details of the control may be as shown in FIG. 12.

Figure 14A:
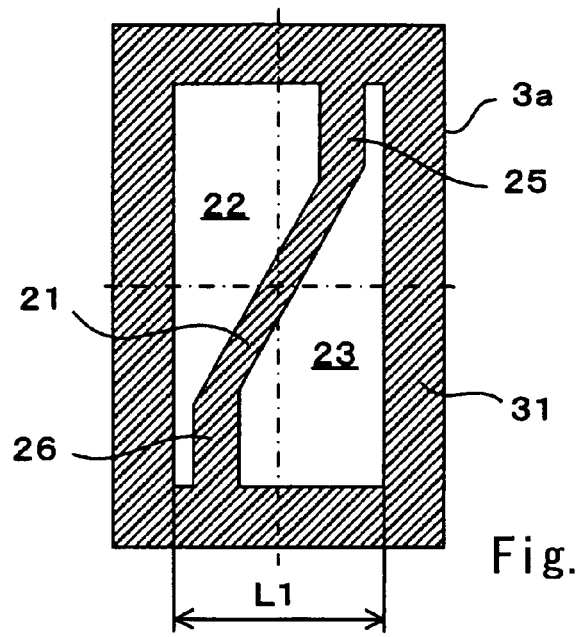
Figure 14B:
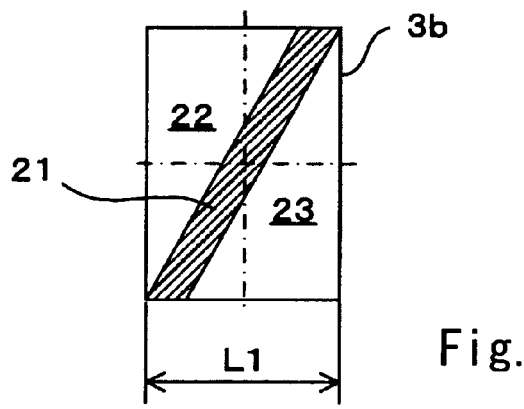
Figure 14C:
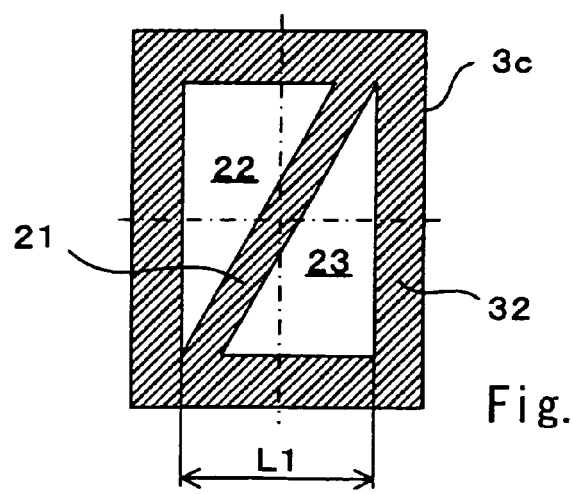

Targets with different surface patterns may also be usable. FIG. 14A is an example 3a with a dark frame area 31 added to the target 3 described above. This example has the advantage that the environment of the target need not necessary be prepared to be dark in order to obtain a waveform as shown in FIGS. 3B-3D. FIG. 14B is another example 3b obtained by eliminating the upwardly and downwardly extending belt-like regions 25 and 26 from the target 3 described above. With this example, however, if the displacement in the up-down direction is large and the dimension of the target 3b in the up-down direction is increased, its dimension in the left-right direction also increases because the diagonal belt-like region 21 extends indefinitely diagonally. From the point of view of reducing the size of the target, therefore, the target 3 described above is more advantageous. FIG. 14C shows still another example 3c having a dark frame portion 32 added to the example 3b of FIG. 14B.

Figure 13A:
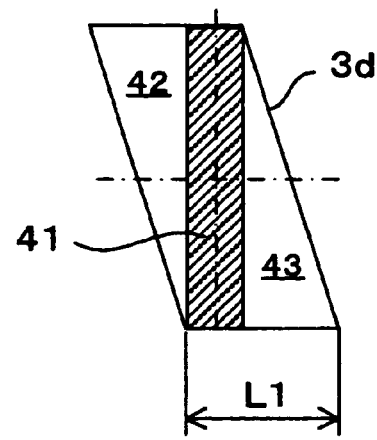
FIGS. 13A, 13B, 13C, 14A, 14B and 14C are front views of targets with different surface patterns.
Figure 13B:
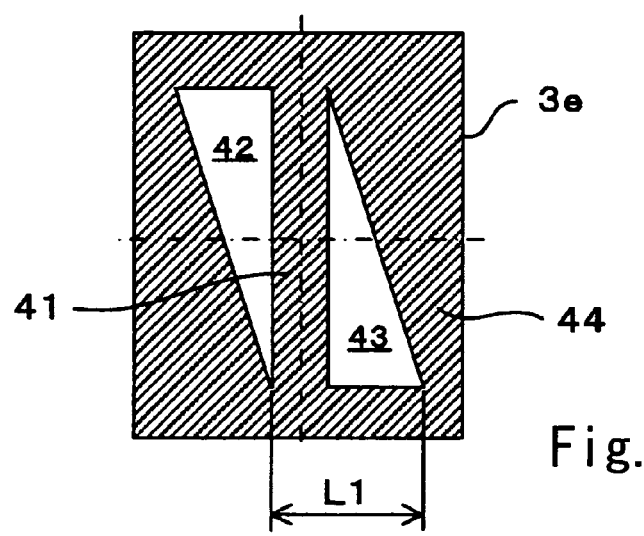

FIG. 13A shows a target 3d in the shape of a parallelogram having side portions with mutually parallel diagonal outer edges. The width L1 of its detection area in the left-right direction is smaller than the width L2 of the detection area in the scan direction. The brightness-darkness pattern on its detection surface includes a belt-like dark region 41 that traverses the center part in the up-down direction and triangular bright inversion areas 42 and 43 on both sides of the center region 41. A waveform with an inverted W-shape can also be obtained from such a target 3d and displacements DX and DY can be similarly obtained from scan quantities a, b and c, except the formulas to be used in this example are DY=c and DX=(a+b)/2−c. FIG.

13B is another example 3e having a dark frame part 44 added to the target 3d of FIG. 13A.

Figure 13C:
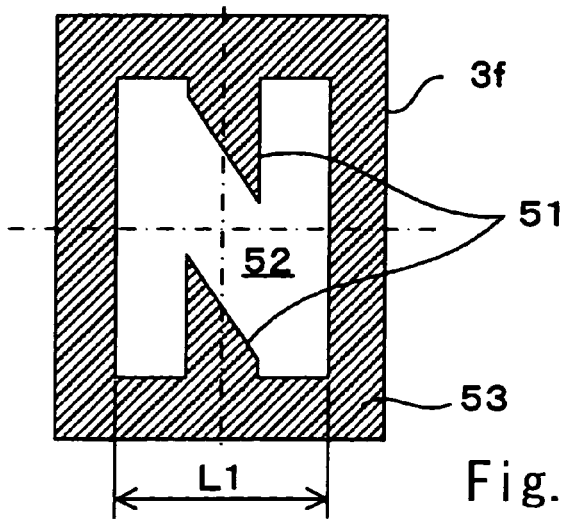

FIG. 13C is still another example 3f, having a pattern with a belt-like dark region 51 with its center part diagonally cut, an N-shaped bright inversion area 52 on both sides and inside this belt-like region 51 and a dark frame-like part 53 around the inversion area 52 and the belt-like region 51 formed on its detection surface. With a pattern like this, too, axial adjustment can be carried out well on the same theory.

The dark frame part 53 may be removed from the example 3f of FIG. 13C. It also goes without saying that the dark part and the bright part may be interchanged in all of the examples of target 3, 3a, 3b, 3c, 3d, 3e and 3f.

Neither do data to be displayed limit the scope of the invention. For example, the waveform of received light may also be displayed.

The operation of setting the target may be automated, say, by using a robot. Alternatively, a target may be fixed and vehicles having a monitoring apparatus set thereon may be transported on a conveyer and sequentially positioned in front of the fixed target.

The invention is applicable not only to a radar for carrying out a two-dimensional scan but also to a radar of the type adapted to scan only in one direction. The invention is further applicable to monitors using electromagnetic waves and acoustic waves.

What is claimed is:

1. A method of adjusting a monitoring apparatus, said monitoring apparatus being adapted to carry out a measurement operation by receiving waves from a detection area at each position on a standard direction and outputting data for identifying at least position of a target object of detection in said detection area based at least on intensity of said received waves, said method serving to correct an axial displacement of said detection area in the direction of rolling; said method comprising the steps of:

providing a target having a detection surface, said detection surface having a specified peripheral shape and having a pattern of bright areas with a larger reflectivity and dark areas with a smaller reflectivity, said peripheral shape and said pattern being such that a waveform of W-form or inverse W-form is obtained due at least to said specified pattern if said measurement operation is carried out with said target placed in front of said monitoring apparatus and with said detecting area facing said detection surface, said waveform being such that a standard position of said detection surface in said standard direction can be calculated therefrom;

placing said target in front of said monitoring apparatus by orienting said detection surface according to said standard direction;

carrying out said measurement operation at least twice by each time changing the position of said monitoring apparatus in the perpendicular direction to said standard direction; and determining the axial deviation of said detection area in the rolling direction based on change in said standard position calculated from said waveform;

wherein said detection surface of said target has outer edges which are perpendicular to said standard direction and has a width in said standard direction, said width being smaller than the dimension of said detection area in said standard direction;

wherein said pattern includes an elongated belt-like region traversing a center part of said detection surface and inversion areas on both sides of said belt-like region, either said belt-like region or said inversion areas having higher reflectivity than the other; and wherein said standard position is determined from position data a and b of points on opposite sides of the center valley or hill of said waveform of W-form or inverse W-form having the same received wave intensity as at said center valley or hill.

2. A method of adjusting a monitoring apparatus, said monitoring apparatus being adapted to carry out a measurement operation by receiving waves from a detection area at each position on a standard direction and outputting data for identifying at least position of a target object of detection in said detection area based at least on intensity of said received waves, said method serving to correct an axial displacement of said detection area in the direction of rolling; said method comprising the steps of:

providing a target having a detection surface, said detection surface having a specified peripheral shape and having a pattern of bright areas with a larger reflectivity and dark areas with a smaller reflectivity, said peripheral shape and said pattern being such that a waveform of W-form or inverse W-form is obtained due at least to said specified pattern if said measurement operation is carried out with said target placed in front of said monitoring apparatus and with said detecting area facing said detection surface, said waveform being such that a standard position of said detection surface in said standard direction can be calculated therefrom;

placing said target in front of said monitoring apparatus by orienting said detection surface according to said standard direction;

carrying out said measurement operation at least twice by each time changing the position of said monitoring apparatus in the perpendicular direction to said standard direction; and determining the axial deviation of said detection area in the rolling direction based on change in said standard position calculated from said waveform;

wherein said pattern includes an elongated belt-like region traversing a center part of said detection surface, inversion areas on both sides of said belt-like region and frame areas further outside of said inversion areas, either said belt-like region and said frame areas or said inversion areas having higher reflectivity than the other, boundary lines between said inversion areas and said frame areas being parallel to said perpendicular direction and mutually separated by a distance smaller than the dimension of said detection area in said standard direction; and wherein said standard position is determined from position data a and b of points on opposite sides of the center valley or hill of said waveform of W-form or inverse W-form having the same received wave intensity as at said center valley or hill.

3. A method of adjusting a monitoring apparatus, said monitoring apparatus being adapted to carry out a measurement operation by receiving waves from a detection area at each position on a standard direction and outputting data for identifying at least position of a target object of detection in said detection area based at least on intensity of said received waves, said method serving to correct an axial displacement of said detection area in the direction of rolling; said method comprising the steps of:

providing a target having a detection surface, said detection surface having a specified peripheral shape and having a pattern of bright areas with a larger reflectivity and dark areas with a smaller reflectivity, said peripheral shape and said pattern being such that a waveform of W-form or inverse W-form is obtained due at least to said specified pattern if said measurement operation is carried out with said target placed in front of said monitoring apparatus and with said detecting area facing said detection surface, said waveform being such that a standard position of said detection surface in said standard direction can be calculated therefrom;

placing said target in front of said monitoring apparatus by orienting said detection surface according to said standard direction;

carrying out said measurement operation at least twice by each time changing the position of said monitoring apparatus in the perpendicular direction to said standard direction; and determining the axial deviation of said detection area in the rolling direction based on change in said standard position calculated from said waveform;

wherein said detection surface of said target has a width in said standard direction which is smaller than the dimension of said detection area in said standard direction;

wherein said pattern includes an elongated belt-like region traversing a center part of said detection surface and inversion areas on both sides of said belt-like region, either said belt-like region or said inversion areas having higher reflectivity than the other, said belt-like region extending parallel to said perpendicular direction; and wherein said standard position is determined from position data c of the center valley or hill of said waveform of W-form or inverse W-form.

4. A method of adjusting a monitoring apparatus, said monitoring apparatus being adapted to carry out a measurement operation by receiving waves from a detection area at each position on a standard direction and outputting data for identifying at least position of a target object of detection in said detection area based at least on intensity of said received waves, said method serving to correct an axial displacement of said detection area in the direction of rolling; said method comprising the steps of:

providing a target having a detection surface, said detection surface having a specified peripheral shape and having a pattern of bright areas with a larger reflectivity and dark areas with a smaller reflectivity, said peripheral shape and said pattern being such that a waveform of W-form or inverse W-form is obtained due at least to said specified pattern if said measurement operation is carried out with said target placed in front of said monitoring apparatus and with said detecting area facing said detection surface, said waveform being such that a standard position of said detection surface in said standard direction can be calculated therefrom;

placing said target in front of said monitoring apparatus by orienting said detection surface according to said standard direction;

carrying out said measurement operation at least twice by each time changing the position of said monitoring apparatus in the perpendicular direction to said standard direction; and determining the axial deviation of said detection area in the rolling direction based on change in said standard position calculated from said waveform;

wherein said pattern includes an elongated belt-like region traversing a center part of said detection surface, inversion areas on both sides of said belt-like region and frame areas further outside of said inversion areas, either said belt-like region and said frame areas or said inversion areas having higher reflectivity than the other, boundary lines between said inversion areas and said frame areas being mutually separated by a distance smaller than the dimension of said detection area in said standard direction, said belt-like region extending parallel to said perpendicular direction; and wherein said standard position is determined from position data c of the center valley or hill of said waveform of W-form or inverse W-form.

5. A method of adjusting a monitoring apparatus, said monitoring apparatus being adapted to carry out a measurement operation by receiving waves from a detection area at each position on a standard direction and outputting data for identifying at least position of a target object of detection in said detection area based at least on intensity of said received waves, said method serving to correct an axial displacement of said detection area in the direction of rolling; said method comprising the steps of:

providing a target having a detection surface, said detection surface having a specified peripheral shape and having a pattern of bright areas with a larger reflectivity and dark areas with a smaller reflectivity, said peripheral shape and said pattern being such that a waveform of W-form or inverse W-form is obtained due at least to said specified pattern if said measurement operation is carried out with said target placed in front of said monitoring apparatus and with said detecting area facing said detection surface, said waveform being such that a standard position of said detection surface in said standard direction can be calculated therefrom;

placing said target in front of said monitoring apparatus by orienting said detection surface according to said standard direction;

carrying out said measurement operation at least twice by each time changing the position of said monitoring apparatus in the perpendicular direction to said standard direction;

determining the axial deviation of said detection area in the rolling direction based on change in said standard position calculated from said waveform; and adjusting an environmental condition according to the reflectivity of said pattern after said target was placed in front of said monitoring apparatus.

6. A method of adjusting a monitoring apparatus, said monitoring apparatus being adapted to carry out a measurement operation by receiving waves from a detection area at each position on a standard direction and outputting data for identifying at least position of a target object of detection in said detection area based at least on intensity of said received waves, said method serving to correct an axial displacement of said detection area in the direction of rolling; said method comprising the steps of:

providing a target having a detection surface, said detection surface having a specified peripheral shape and having a pattern of bright areas with a larger reflectivity and dark areas with a smaller reflectivity, said peripheral shape and said pattern being such that a waveform of W-form or inverse W-form is obtained due at least to said specified pattern if said measurement operation is carried out with said target placed in front of said monitoring apparatus and with said detecting area facing said detection surface, said waveform being such that a standard position of said detection surface in said standard direction can be calculated therefrom;

placing said target in front of said monitoring apparatus by orienting said detection surface according to said standard direction;

carrying out said measurement operation at least twice by each time changing the position of said monitoring apparatus in the perpendicular direction to said standard direction;

determining the axial deviation of said detection area in the rolling direction based on change in said standard position calculated from said waveform; and correcting the determined axial deviation by changing angle of attachment of said monitoring apparatus or by changing a parameter for setting said detection area.

7. A method of adjusting a monitoring apparatus, said monitoring apparatus having a radar adapted to carry out a measurement operation by receiving waves from a first detection area at each position on a standard direction and outputting data for identifying at least position of a target object of detection in said first detection area based at least on intensity of said received waves and a camera for taking an image of a second detection area that overlaps said first detection area, said method serving to adjust positions and orientations of said first detection area and said second detection area and to obtain a coordinate conversion parameter between said radar and said camera; said method comprising the steps of:

setting a single target at a specified position which is both in said first detection area and said second detection area;

adjusting said first detection area based on measurements taken of said target by said radar; and thereafter determining axial displacement of said second detection area and obtaining said coordinate conversion parameter based on an image of said target taken by said camera.

8. The method of claim 7 further comprising the steps of:

obtaining axial displacement data on axial displacement of said first detection area or said second detection area based on results of measurement by said radar or said image of said target taken by said camera;

displaying said axial displacement data on a display device; and adjusting said first detection area or said second detection area while observing said displayed axial displacement data until the axial displacement of said first detection area or said second detection area becomes within an allowable range.

9. A method of adjusting a monitoring apparatus, said monitoring apparatus having a radar adapted to carry out a measurement operation by receiving waves from a first detection area at each position on a standard direction and outputting data for identifying at least position of a target object of detection in said first detection area based at least on intensity of said received waves and a camera for taking an image of a second detection area that overlaps said first detection area, said method serving to adjust position and orientation of said first detection area and said second detection area and to obtain a coordinate conversion parameter between said radar and said camera; said method comprising the steps of:

setting a single target at a specified position which is both in said first detection area and said second detection area;

determining adjustability of said first detection area based on measurements taken of said target by said radar and adjusting said first detection area only if it is determined to be adjustable; and thereafter determining adjustability of axial displacement of said second detection area based on an image of said target taken by said camera and obtaining said coordinate conversion parameter based on said image of said target taken by said camera if it is determined to be adjustable.

10. The method of claim 9 further comprising the steps of:

obtaining axial displacement data on axial displacement of said first detection area or said second detection area based on results of measurement by said radar or said image of said target taken by said camera;

displaying said axial displacement data on a display device; and adjusting said first detection area or said second detection area while observing said displayed axial displacement data until the axial displacement of said first detection area or said second detection area becomes within an allowable range if adjustment is determined to be possible.

* * * * *